(12) United States Patent
Ohshima et al.

(10) Patent No.: US 7,889,527 B2
(45) Date of Patent: *Feb. 15, 2011

(54) ELECTRICAL POWER SOURCE, OPERATIONAL METHOD OF THE SAME, INVERTER AND OPERATIONAL METHOD OF THE SAME

(75) Inventors: Masaaki Ohshima, Tokyo (JP); Shuuichi Ushiki, Tokyo (JP); Jirou Fukui, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/550,028

(22) Filed: Aug. 28, 2009

(65) Prior Publication Data

US 2009/0310390 A1      Dec. 17, 2009

Related U.S. Application Data

(62) Division of application No. 11/414,662, filed on Apr. 27, 2006, now Pat. No. 7,602,627.

(30) Foreign Application Priority Data

Apr. 28, 2005    (JP)    ............................ P2005-132716
Apr. 28, 2005    (JP)    ............................ P2005-132717
Apr. 28, 2005    (JP)    ............................ P2005-132718

(51) Int. Cl.
*H02M 7/493*     (2007.01)
*H02M 7/53*      (2006.01)
(52) U.S. Cl. ............................ 363/97; 363/71; 363/140
(58) Field of Classification Search .................. 363/65, 363/71, 72, 95, 97, 98, 131, 132, 140; 307/51, 307/52, 53, 56, 58, 60, 62, 82
See application file for complete search history.

(56) References Cited

U.S. PATENT DOCUMENTS

| 3,675,037 | A  |   | 7/1972  | Hamilton |
| 5,436,512 | A  |   | 7/1995  | Inam et al. |
| 6,703,796 | B2 |   | 3/2004  | Che-Chen et al. |
| 7,109,667 | B2 | * | 9/2006  | Matsushima et al. ........ 315/224 |
| 7,602,627 | B2 | * | 10/2009 | Ohshima et al. .............. 363/97 |

FOREIGN PATENT DOCUMENTS

| JP | 07-007950 | 1/1995 |
| JP | 08-205543 | 8/1996 |

(Continued)

*Primary Examiner*—Gary L Laxton
(74) *Attorney, Agent, or Firm*—Kolisch Hartwell, PC

(57) ABSTRACT

An electric power source in which a plurality of inverters operate on the same frequency and the plurality of inverters are connected in parallel so that a resistance value expressed by $(1-\beta \cdot G)/(\alpha \cdot G)$ where $\alpha$ is the output voltage feedback gain, $\beta$ is the output current feed forward gain, and $G$ is the inverter current gain, is made to be the equivalent output impedance; and is an electrical power source in which the cross-current between the inverters are made to be an acceptable value or below by adjusting the output of each of the inverters by controlling the equivalent output impedance by modifying both or either one of the output voltage feedback gain $\alpha$ or the output current feed forward gain $\beta$.

14 Claims, 5 Drawing Sheets

FOREIGN PATENT DOCUMENTS

| | | |
|---|---|---|
| JP | 08-223807 | 8/1996 |
| JP | 08-223808 | 8/1996 |
| JP | 09-140148 | 5/1997 |
| JP | 09-331681 | 12/1997 |
| JP | 2000-125575 | 4/2000 |
| JP | 2000-341956 | 12/2000 |
| JP | 2001-177997 | 6/2001 |
| JP | 2002-262577 | 9/2002 |
| JP | 2004-236496 | 8/2004 |

* cited by examiner

ELECTRICAL POWER SOURCE, OPERATIONAL METHOD OF THE SAME, INVERTER AND OPERATIONAL METHOD OF THE SAME

RELATED APPLICATIONS

Priority is claimed on Japanese Patent Application No. 2005-132716, filed Apr. 28, 2005, Japanese Patent Application No. 2005-132717, filed Apr. 28, 2005, and Japanese Patent Application No. 2005-132718, filed Apr. 28, 2005, the content of which are incorporated herein by reference.

BACKGROUND OF THE INVENTION

1. Field of the Invention

The present invention relates to an electric power source, an operational method of the electric power source, an inverter and an operation method of the inverter that has the ability to regulate an output current by adjusting equivalent output impedance by only control parameters.

2. Description of Related Art

A plurality of storage batteries connected in a series are provided in an uninterruptible power supply system for communication, however, the terminal voltage of these storage batteries are often in a sufficiently low state after an interruption of power or immediately after diagnostics. When turning on the power switch in this state, over-current, i.e. a large inrush current, flows resulting in a hazardous situation that can break the switch element; therefore, an inrush current prevention circuit is equipped to the electric power source to prevent against inrush current, or a switch element is placed in the inverter to initiate a soft start, in other words, to execute a soft start control that keeps the pulse width small at first and gradually increases the pulse width. However, when an inrush current prevention circuit is equipped, problems such as the generation of power loss, heat, a drop in reliability, and cost accompany this. A further problem is the requirement for soft start control circuitry when using a soft start control.

Moreover, when a large amount of output capacity is required, a redundancy operation can be performed from the oldest by connecting a plurality of inverters in parallel or rectifying power supply. Further, in order to improve the reliability of a power source system employing the inverters, especially, an uninterruptible power supply system, it is common to connect a plurality of inverters in parallel in a construction having a sufficient level of redundancy to load capacity. Further, when operated redundantly by connecting a plurality of these inverters in parallel, a power switch is equipped in each inverter (see for example, Japanese Patent Application First Publication No. H09-331681). With such type of uninterruptible power supply system, when connecting or disconnecting a certain inverter while in parallel operation, the power switch is always turned ON or OFF; and the power switch is necessarily turned ON or OFF even when connecting parallel connected inverters to a commercial AC electrical power system or when opening.

On the other hand, there are various proposals that relate to constantly-sampled error-tracking-mode inverter technology that the embodiment of the present invention can apply (see for example Japanese Patent Application First Publication No. H07-7950, Japanese Patent Application First Publication No. 2000-125575, and Japanese Patent Application First Publication No. 2000-341956). Brief explanation of the constantly-sampled error-tracking-mode power source provides for a first electric current detection means for detecting the output current of the inverter consisting of an inverter and an output filter circuit connected to the output side thereof, a second electric current detection means for detecting the AC current that flows between the inverters and the output filter circuitry, and an AC current detection means for detecting the voltage of the output filter circuitry. Further, the electric current target function signal J(t) is formed by adding the signal that multiplies the output current feed forward gain $\beta$, which is the control parameter, by the electric current detection signal from the first electric current detection means, to the signal obtained by multiplying the output voltage feedback gain $\alpha$ by the voltage signal showing the difference between a reference voltage (a voltage requested, determined or desired beforehand) and the voltage detection signal from the AC voltage detector. Next, the error signal $\Delta t$ that shows the difference between the electric current detection signal from the second electric current detector and the electric current target function signal J(t) determines whether or not $\Delta t$ is within the target tracking range at each of the constantly-sampled cycles. A high frequency PWM signal is generated that controls the instantaneous value of the electric current by sampling the error signal $\Delta t$, then a switching mode for switching elements of the inverter is selected according to the error signal $\Delta t$.

When the error signal $\Delta t$ is negative, because the output current of the inverter is smaller than the electric current target function signal J(t), the switching mode is selected that increases the output current of the inverter; and when the error signal $\Delta t$ is positive, because the output current of the inverter is larger than the electric current target function signal J(t), the switching mode is selected that decreases the output current of the inverter thereby controlling the electric current detection signal of the first electric current detection means to be within the prescribed range.

Further, when operating in parallel by connecting a plurality of rectifiers in parallel, the flow of current, i.e. cross-current, is prevented to flow into the other rectifiers from a certain rectifier by connecting a diode, for example, for preventing back-current into the output of each rectifier and connecting in parallel in the subsequent stage thereof. There are other various constructions for preventing cross-current, and since the prevention of cross-current in a rectifier is a simple matter, parallel operation of rectifiers is widely used.

However, in case of undertaking parallel operation of inverters, limiting the cross-current to a small value while controlling the pulse width of each of the inverters to regulate the AC output electrical power is difficult. Voltage differences and current differences occur between inverters when the output voltage approaches the reference value by controlling the pulse width of the switching element of the inverters which makes this technically difficult. According to circumstances, the polarity can be opposite depending on the case; therefore, there are various ideas already proposed for technology to resolve these problematic points.

For example, stability of parallel operation for master and slave inverters has been devised (see for example, Japanese Patent Application First Publication No. H08-205543) by, prior to initializing parallel operation of the master and slave inverters, a phase correction signal is delivered that matches the phase of the zero cross detection signal from the control circuit of the slave inverter to the phase of the zero cross signal from the zero cross detection circuit in the control circuit of the master inverter, and the phase of the standard pulse consisting of the basic control signal of the control circuit is corrected by the phase correction signal. Other inventions for suppressing cross-current are also proposed (see for example, Japanese Patent Application First Publication No. H08-223807, Japanese Patent Application First Publication No.

H09-140148, Japanese Patent Application First Publication No. 2001-177997, Japanese Patent Application First Publication No. 2002-262577, and Japanese Patent Application First Publication No. 2004-236496).

In addition, suppressing cross-current flow for parallel operation of a plurality of inverters is also proposed by performing an instantaneous value control to make the internal impedance of each inverter to be equally zero to provide stable control over transitory deviation of the phase and amplitude of the output voltage by inputting each load current corresponding value and output current corresponding value for each inverter into the cross-current detection circuit respectively, and outputting the cross-current corresponding value that corresponds to the cross-current flowing between the inverters, and outputting the valid power deviation and the invalid power deviation from the output voltage corresponding value of the inverters and the cross-current electric current corresponding value, and outputting the voltage control value according to such valid power deviation, and outputting the phase control value from the invalid power deviation (see for example Japanese Patent Application First Publication No. H08-223808).

However, conventional inverters that provide inrush current prevention circuitry or perform inrush current prevention by executing a soft start control have the problems described above when driven by storage batteries or a condenser load.

The electric power source of Japanese Patent Application First Publication No. H09-331681, when closing, separating, or opening for a certain inverter, cross-current increases due to the unevenness of the time delay for the power switch, and a large inrush current flows on account of the operational state of the inverter when turning the power switch ON or OFF and this can generate a negative effect; and when performing regular tests, maintenance, or inspections using remote monitoring, there are numerous problems in performing test, maintenance, or inspections that cannot be completed without turning off the power switch.

There are various technological advantages to the constantly sampled type error tracking power source technology given in the inventions of Japanese Patent Application First Publication No. H07-7950, Japanese Patent Application First Publication No. 2000-125575, and Japanese Patent Application First Publication No. 2000-341956; however, although the primary disclosure is the fundamental technology that relates to a single inverter, technology relating to inrush current prevention that easily occurs when operating a storage batter or condenser load, i.e. parallel operation of inverters, and methods for resolving the problematic issues relating thereto, are not yet disclosed.

The object of the present invention is to provide not only a constantly sampled type error tracking inverter technology, but an inverter that has the ability to make the output into a desired value by controlling the equivalent internal impedance by only the control parameters; and an inverter that can easily achieve the prevention of inrush current by applying these in the operation of parallel connected inverters; or an inverter that performs an interrupt or opening and equal work by substantially suspending (partially stopping of feeding, or a state like sleeping) or closing an arbitrary inverter by an extremely easy method without providing a negative influence due to a surge voltage or surge current when a plurality of inverters are in parallel operation.

Further, the measure to prevent cross-current as disclosed by the invention on Japanese Patent Application First Publication No. H08-223807, Japanese Patent Application First Publication No. H09-140148, Japanese Patent Application First Publication No. 2001-177997, Japanese Patent Application First Publication No. 2002-262577, Japanese Patent Application First Publication No. 2004-236496, and Japanese Patent Application First Publication No. H08-223808 has significant weaknesses in that various complicated functions or circuitry is required resulting in not only an increased size of the electric power source itself by increases the cost of the electric power source while reducing the reliability. Further, there is the problem that it is not possible to prevent the generation of cross-current due to the generation of noise during operation even when providing so many complicated functions and circuitry.

The object of the present invention is to provide not only constantly sampled type error tracking electric power source technology, but that which is suited to parallel operation of inverters that has the ability to control the equivalent internal impedance by only the control parameters and to devise a drastically simplified cross-current suppression technology in an electric power source consisting of a plurality of inverters connected in parallel that have the ability to control the equivalent internal impedance by only the control parameters.

SUMMARY OF THE INVENTION

A first aspect of the present invention provides an operation method of an inverter where the value of the equivalent output impedance can be adjusted by adjusting only control parameters, including the step of adjusting the control parameter in order to adjust the output of the inverter by changing the value of the equivalent output impedance.

A second aspect of the present invention provides an operation method of an inverter where the value of the equivalent output impedance can be adjusted by only control parameters, including the steps of: setting the value of the equivalent output impedance prior to a starting of feeding of power to a first set value that limits the output current to below a desired value; and adjusting the control parameter after starting of feeding to change the equivalent output impedance to a second set value that is smaller than the first set value.

A third aspect of the present invention provides an operation method of an inverter where the value of the equivalent output impedance can be adjusted by only control parameters, including the steps of: setting the value of the equivalent output impedance to a first set value that restricts the output current to below a desired value; connecting in parallel the inverter to another inverter or connecting to a commercial AC electrical power system without performing synchronism; synchronizing the output voltage of the inverter with the output voltage of said another inverter or to the voltage of the commercial AC electrical power system; and decreasing the equivalent output impedance of the inverter by adjusting the control parameter to a second set value that is smaller than the first set value.

A fourth aspect of the present invention provides an operation method of an inverter where the value of the equivalent output impedance can be adjusted by only control parameters, including the step of adjusting the control parameter of the inverter to stop or suspend feeding substantially by changing the value of the equivalent output impedance to be a first set value that limits the output current to be an acceptable value or below.

A fifth aspect of the present invention provides an operation method of the inverter according to the second aspect, wherein a power of the inverter turns on with the equivalent output impedance at the first set value.

A sixth aspect of the present invention provides an operation method of the inverter according to the fourth aspect, wherein a power of the inverter turns off with the equivalent output impedance at the first set value.

A seventh aspect of the present invention provides an operation method of an inverter where the value of the equivalent output impedance can be adjusted by only control parameter including the step of changing the equivalent output impedance of the inverter to be substantially opened (paralleled off) to a first set value that limits the output current to be a desired value or below while the inverter is connected to a commercial AC electrical power system.

An eighth aspect of the present invention provides an operation method of the inverter according to the second aspect, further including the step of changing the equivalent output impedance to the first set value or to the second set value in accordance with a time constant that does not have substantially any negative impact on other inverters.

A ninth aspect of the present invention provides an inverter in which an equivalent output impedance is a resistance value expressed by $(1-\beta*G)/(\alpha*G)$ when $\alpha$ is an output voltage feedback gain, $\beta$ is an output current feed forward gain, and G is the inverter current gain, wherein the inverter adjusts the inverter output by changing the equivalent output impedance by adjusting both or either one of the output voltage feedback gain $\alpha$ or the output current feed forward gain $\beta$.

A tenth aspect of the present invention provides an inverter according to the ninth aspect, wherein: the equivalent output impedance of the inverter prior to start feeding power is set to be a first set value that limits the output current to be a desired value or below by changing the equivalent output impedance by adjusting both or either one of the output voltage feedback gain $\alpha$ or the output current feed forward gain $\beta$; and the equivalent output impedance of the inverter is decreased after starting feeding to be a second set value that is smaller than the first set value.

An eleventh aspect of the present invention provides an inverter according to the ninth aspect, wherein: the equivalent output impedance is set to be a first set value that limits the output current to be a desired value or below; the inverter is connected in parallel to another inverter without synchronism, or is connected to a commercial AC electrical power system without doing so; the output voltage of the inverter is synchronized with the output voltage of said another inverter or to the voltage of the commercial AC electrical power system; and the equivalent output impedance of the inverter is changed to a second set value that is smaller than the first set value.

A twelfth aspect of the present invention provides an inverter according to the ninth aspect, wherein the equivalent output impedance of the inverter is set to be a first set value or below that limits the output current to be a desired value by adjusting both or either one of the output voltage feedback gain $\alpha$ or the output current feed forward gain $\beta$ when the feeding is substantially stopped or suspended.

A thirteenth aspect of the present invention provides an inverter according to the tenth aspect, wherein the equivalent output impedance is changed to the first set value or the second set value in time that is 3 times or more a length than the output power cycle t of the inverter when not connected to a commercial AC electrical power system, and 50 times or more than a length of the commercial AC power cycle when connected to the commercial AC electrical power system.

A fourteenth aspect of the present invention provides an operational method of an electric power source constituted by a plurality of parallel connections of inverters that change equivalent output impedances by adjusting only control parameters, including the step of adjusting load sharing of the inverters by changing the equivalent output impedance of each inverter by changing values of the control parameters.

A fifteenth aspect of the present invention provides an operational method of the electric power source according to the fourteenth, including the steps of: both setting the equivalent output impedance of the inverter at a first set value which is a large value determined respectively, in order to substantially prevent sharing the load if the inverter is included in a portion of the inverters; and setting the equivalent output impedance of the inverter at a second set value which is smaller than the first set value and is determined respectively, in order to share the load if the inverter is not included in the portion of the inverters; or respectively setting the equivalent output impedance of the inverter at the second set value in order to share the load; and changing the equivalent output impedances to the first set values when the portion of or all the inverters with their equivalent output impedances are at the second set values in order to substantially stop or suspend feeding when a load demand decreases.

A sixteenth aspect of the present invention provides an operational method of an electric power source according to the fourteenth aspect, including the step of setting the equivalent output impedance of the inverter at a first set value which is a large value determined respectively, in order to substantially prevent sharing the load if the inverter is included in a portion of the inverters; setting the equivalent output impedance of the inverter at a second set value which is smaller than the first set value determined respectively, in order to share the load if the inverter is not included in the portion of the inverters; and changing the equivalent output impedance of all or a portion of the inverters from the first set value to the second set value in order to share the load when a load demand increases.

A seventeenth aspect of the present invention provides an electric power source in which a plurality of inverters operate on a same frequency and connected in parallel while the equivalent output impedance of the inverter that is a resistance value is expressed by $(1-\beta*G)/(\alpha*G)$ when $\alpha$ is a voltage feedback gain, $\beta$ is an electric current feed forward gain, and G is the inverter current gain, wherein a load sharing of the inverter is adjusted by changing the equivalent output impedance by changing both or either one of the voltage feedback gain $\alpha$ or the electric current feed forward gain $\beta$.

An eighteenth aspect of the present invention provides an electric power source according to the seventeenth aspect, wherein the equivalent output impedance of the inverter is set to a first set value which is a large value determined respectively, in order to substantially prevent sharing a load if the inverter is included in a portion of the inverters; the equivalent output impedance of the inverter is set to a second set value which is smaller than the first set value determined respectively, in order to share the load if the inverter is not included in the portion of the inverters; and the equivalent output impedance of all or a portion of the inverters is changed to the first set value in order to substantially stop or suspend sharing the load when a load demand decreases.

A nineteenth aspect of the present invention provides an electric power source according to the seventeenth aspect, wherein: the equivalent output impedance of the inverter included in a portion of the inverters is set to a first set value while the equivalent output impedance of the inverter is set to a second set value if the inverter is not included in the portion when the electric power source; and the equivalent output impedance of all or a portion of the inverters is changed to the second set value when an increase of the load is detected.

A twentieth aspect of the present invention provides an electric power source according to the seventeenth aspect, wherein: the inverter, includes: an inverter converting DC input into AC output; an output filter provided at the output side of the inverter; a first electric current detection unit detecting the AC current flowing between the inverter and the output filter; a second electric current detection unit detecting the AC current flowing to the output terminal; an AC voltage detector detecting the voltage of the output filter; an electric current reference value formation unit generating an current target value J(t) obtained by adding a signal obtained by multiplying the electric current feed forward gain β that is one of the control parameters by an electric current detection signal from the second electric current detection unit, to a signal value obtained by multiplying the voltage feedback gain α which is other control parameter by the voltage signal value which indicates a difference between the voltage detected by the AC voltage detector and a reference voltage; and the gate signal and PWM control unit for providing a gate signal that controls an instantaneous value of the inverter current to the inverter by sampling an error signal Δ(t) which shows a difference between the current target value J(t) and a signal value of the AC current detected by the first electric current detection unit, at each constantly-sampled cycle in order to reduce the error signal value Δ(t).

A twenty-first aspect of the present invention provides an electric power source according to the seventeenth aspect, wherein: m units of the inverters feed power while satisfying a equation Pd*m>Wt>Pd*(m−1), when: N is a number of the inverters connected in parallel; Wt is a total demanded load; Pr is a normal rated power of the inverter; Xu is an acceptable limit value of power efficiency; Pu is a lower limit value of an output power corresponding to Xu; Pd is a power between Pr and Pu; and m</=N.

A twenty-second aspect of the present invention provides an inverter according to the twentieth aspect, wherein the gate signal and PWM control unit generates a high frequency PWM signals for controlling instantaneous value of the electric current by sampling the error signal value Δ(t) at each constantly-sampled cycle and provide to the inverter in order to reduce the error signal value Δ(t).

A twenty-third aspect of the present invention provides an operation method of an electric power source constructed from a plurality of inverters that are connected in parallel and change values of the equivalent output impedances by adjusting only control parameters, including the step of adjusting the equivalent output impedance of each of the inverter in order to reduce cross-currents among the inverters to an acceptable value or below.

A twenty-fourth aspect of the present invention provides an electric power source including: a plurality of inverters according to the ninth aspect connected in parallel and that operate on a same frequency, wherein cross-currents among the inverters are reduced to an acceptable value or below by adjusting each of the inverter output.

A twenty-fifth aspect of the present invention provides the electric power source according to the twentieth aspect, wherein: a plurality of the inverters are connected in parallel and operate on a same frequency and on a same phase; all reference voltages of each inverter are generated at a same time; and the inverter respectively adjusts the equivalent output impedance in order to reduce cross-currents among the inverters to an acceptable value or below.

A twenty-sixth aspect of the present invention provides an electric power source according to the twenty-fourth aspect further including: a power cycle signal generation unit that generates a power cycle signal to determine an output frequency of the electric power source, wherein: the power cycle signal generation unit supplies the cycle signal to each of the inverters; and the inverter respectively receives the cycle signal from the cycle signal generation unit and includes a voltage reference unit that generates a reference voltage synchronized to the power cycle signal.

A twenty-seventh aspect of the present invention provides an operation method according to the fourteenth aspect, further including the steps of: reducing the cross-current among the inverters to an acceptable value or below by adjusting the equivalent output impedance of each inverter; generating a synchronization signal for specifying an output frequency of the electric power source; supplying the synchronization signal to each of the inverters; receiving the synchronization signal by each of the inverters; and generating reference voltages synchronized to the synchronization signal.

A twenty-eighth aspect of the present invention provides an operation method of an electric power source that is constructed from a plurality of inverters connected in parallel and each of the inverters is operated according to the first aspect, including the steps of: reducing a cross-current among the inverters to an acceptable value or below by respectively adjusting the equivalent output impedance of the inverter; generating a synchronization signal for specifying an output frequency of the electric power source; supplying the synchronization signal to each of the inverters; receiving the synchronization signal by each inverter; and generating a reference voltage synchronized to the synchronization signal.

According to the first invention, in order to resolve the problems described above, an operation method of an inverter is provided that does not generate an electric power loss because the output of an inverter, more specifically, the output current can be adjusted to a desired value by changing the value of the equivalent internal impedance by adjusting only the control parameters to obtain a desired output through a very simple means thereby enabling an equivalent internal impedance to be realized through control.

According to the second invention, in order to resolve the problems described above, an operation method of an inverter is provided that is suited to a capacitive load because the inverter can be closed in a shockless manner allowing the power supply to be initialized by raising the equivalent internal impedance only by adjusting the control parameters thereby enabling suppression of the inrush current at start up.

According to the third invention, in order to resolve the problems described above, an operation method is provided that has the ability to connect an inverter in parallel to other inverters without executing a synch verification, or can link to a commercial AC electrical power system; and it can stop the power supply, i.e. cause a state of suspension in the inverter, by increasing the equivalent internal impedance by adjusting only the control parameters, and it can close the inverters without giving a negative impact due to a surge, i.e. in a shockless manner, or it can connect to a commercial AC electrical power system.

According to the fourth invention, in order to resolve the problems described above, an operation method is provided that has the ability to stop the power supply, i.e. cause a virtual state of suspension in the inverter, by increasing the equivalent internal impedance by adjusting only the control parameters; and accordingly, it can initiate the power supply immediately in an increased time of the power demand because the inverter can be put into a state of suspension, i.e. a stand-by state, without turning the power switch off.

According to the fifth invention, the power switch can be turned ON without a negative impact due to surge, i.e. in a shockless manner, by turning the power switch on while the inverter is in a virtual state of suspension.

According to the sixth invention, the inverter can be completely separated without a negative impact due to surge, i.e. in a shockless manner, by turning the power switch off while the inverter is in a virtual state of suspension.

According to the seventh invention, in order to resolve the problems described above, an operation method is provided that has the ability to take the inverter off parallel without a negative impact due to surge, i.e. in a shockless manner, by stopping the power supply, i.e. cause a virtual state of suspension in the inverter, by increasing the equivalent internal impedance by adjusting only the control parameters.

According to the eighth invention, closing, separating, and opening of the inverter can be done reliably in a shockless manner as a result of performing a smooth change of the equivalent internal impedance because the adjusting of the control parameter is performed over a prescribed time.

According to the ninth invention, in order to resolve the problems described above, an inverter is provided that has a small power loss because the output of the inverter, more specifically, the output current, is adjusted to a desired value by changing the value of the equivalent internal impedance by adjusting only the control parameters thereby obtaining a desired output through a very simple means thereby realizing the equivalent internal impedance through control.

According to the tenth invention, in order to resolve the problems described above, an inverter is provided that has a small power loss and is suited to a capacitive load because the inverter can be closed in a shockless manner allowing the power supply to be initialized by raising the equivalent internal impedance only by adjusting the control parameters thereby enabling suppression of the inrush current at start up.

According to the eleventh invention, in order to resolve the problems described above, an inverter that has a small power loss is provided that has the ability to connect an inverter in parallel to other inverters without executing a synch verification, or can connect to a commercial AC electrical power system; and it can stop the power supply, i.e. cause a state of suspension in the inverter, by increasing the equivalent internal impedance by adjusting only the control parameters, and it can close the inverters without giving a negative impact due to a surge, i.e. in a shockless manner, or it can connect to a commercial AC electrical power system.

According to the twelfth invention, in order to resolve the problems described above, an inverter that has a small power loss is provided that has the ability to stop the power supply, i.e. cause a virtual state of suspension in the inverter, by increasing the equivalent internal impedance by adjusting only the control parameters; and accordingly, it can initiate the power supply immediately in an increased time of the power demand because the inverter can be put into a state of suspension, i.e. a stand-by state, without turning the power switch off.

According to the thirteenth invention, an inverter can be provided in which closing, separating, and opening of the inverter can be done reliably in a shockless manner as a result of performing a smooth change of the equivalent internal impedance because the adjusting of the control parameter is performed over a prescribed time.

According to the fourteenth invention, operation can be performed in a high power efficient region without providing a surge voltage or the like to the load even if the load power demand is greatly or suddenly reduced and can automatically change the load sharing of each inverter by selectively setting the equivalent internal impedance held by the constantly sampled type error tracking power source according to the reduction of the load power demand.

According to the fifteenth invention, operation with a smaller electric power loss is possible without having an effect such as a surge voltage or the like to the load because the power switch is OFF and separated in a state where output power is effectively not generated.

According to the sixteenth invention, operation can be performed in a high power efficient region without providing a surge voltage or the like to the load even if the load power demand is greatly or suddenly increased and can automatically change the load sharing of each inverter by selectively setting the equivalent internal impedance held by the constantly sampled type error tracking power source according to the increase in the load power demand.

According to the seventeenth invention, continuous operation with high power efficiency is possible without having an effect such as a surge voltage or the like to the load because the power switch is ON and connected in a state where output power is effectively not generated.

According to the eighteenth and nineteenth inventions, setting load sharing to a region of high power efficiency is easily possible because the equivalent internal impedance of each inverter can be automatically set to a desired value through an extremely simple means.

According to the twentieth invention, limiting the cross-current that flows between the inverters to below an acceptable limit is possible not only in high power efficiency operation without affecting a surge voltage of the like to the load.

According to the twenty first invention, operation in high power efficiency can be done to a greater extent without a negative impact due to a surge voltage to the load.

According to the twenty second invention, a detailed construction can be provided of a constantly sampled type error tracking power source with the ability for a shockless start up enabling suppression of the easily occurring inrush current at the time of start up of the power source without inrush current prevention circuitry or performing a soft start control.

According to the twenty third invention, an operation method of an electric power source can be provided that has the ability to reliably limit the cross-current to a small current value flowing between the inverters connected in parallel in a plurality of units by merely adjusting the control parameters.

According to the twenty fourth invention, an electric power source can be provided that has the ability to reliably limit the cross-current flowing between the inverters to a small current value by adjusting the output of the inverters connected in parallel by changing the equivalent internal impedance by modifying both or either one of the output voltage feedback gain $\alpha$ or the output current feed forward gain $\beta$.

More particularly, according to the twenty fifth through twenty eighth inventions, a detailed construction is provided in an electric power source that has the ability to reliably limit cross-current to be an acceptable value or below.

DETAILED DESCRIPTION OF THE INVENTION

Embodiment 1

Figure 1:
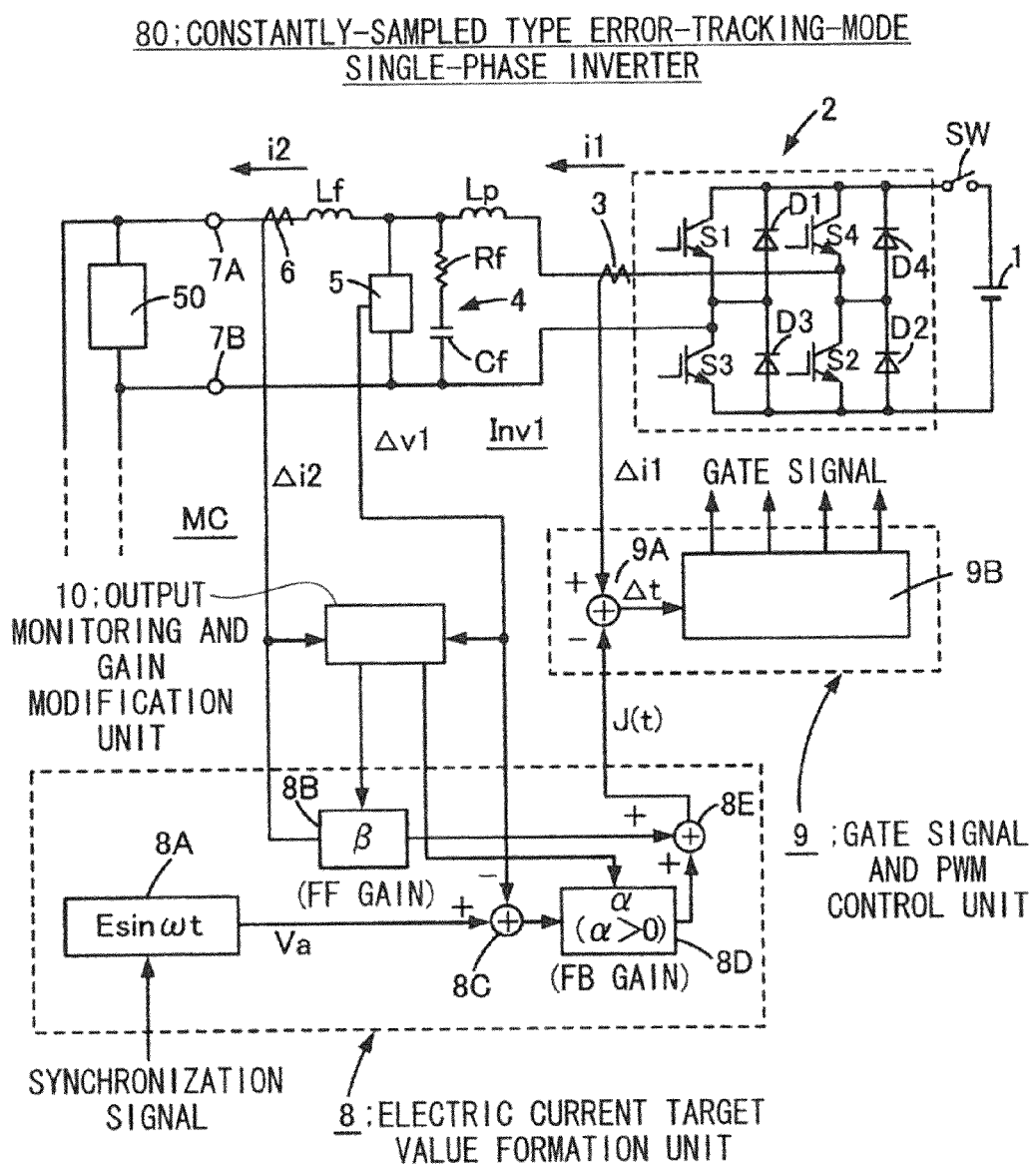
FIG. 1 is a drawing to show the constantly-sampled error-tracking-mode (ETM) single-phase inverter 80 used in Embodiment 1 that relates to the present invention.
Figure 2:
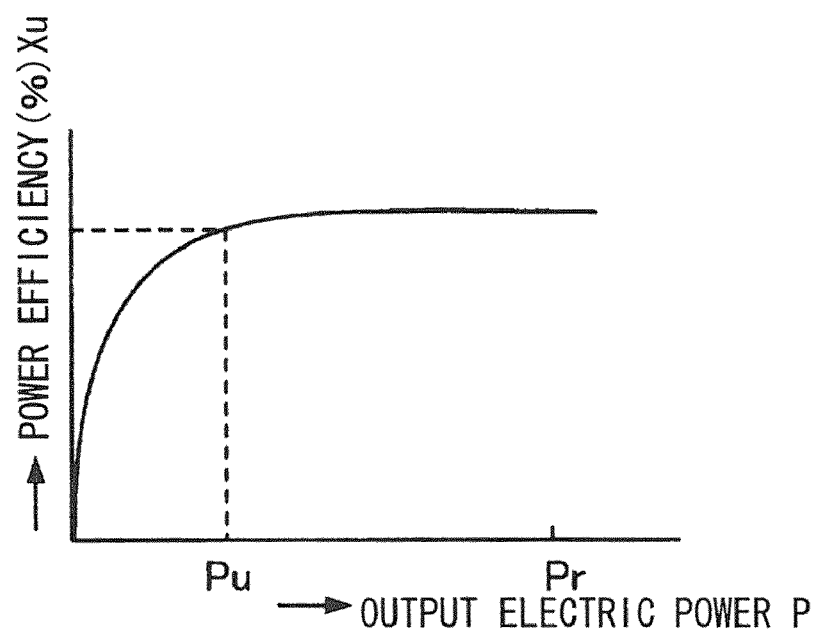
FIG. 2 is a drawing to show an example of the power efficiency of the constantly-sampled error-tracking-mode single-phase inverter that relates to the present invention.
Figure 3:
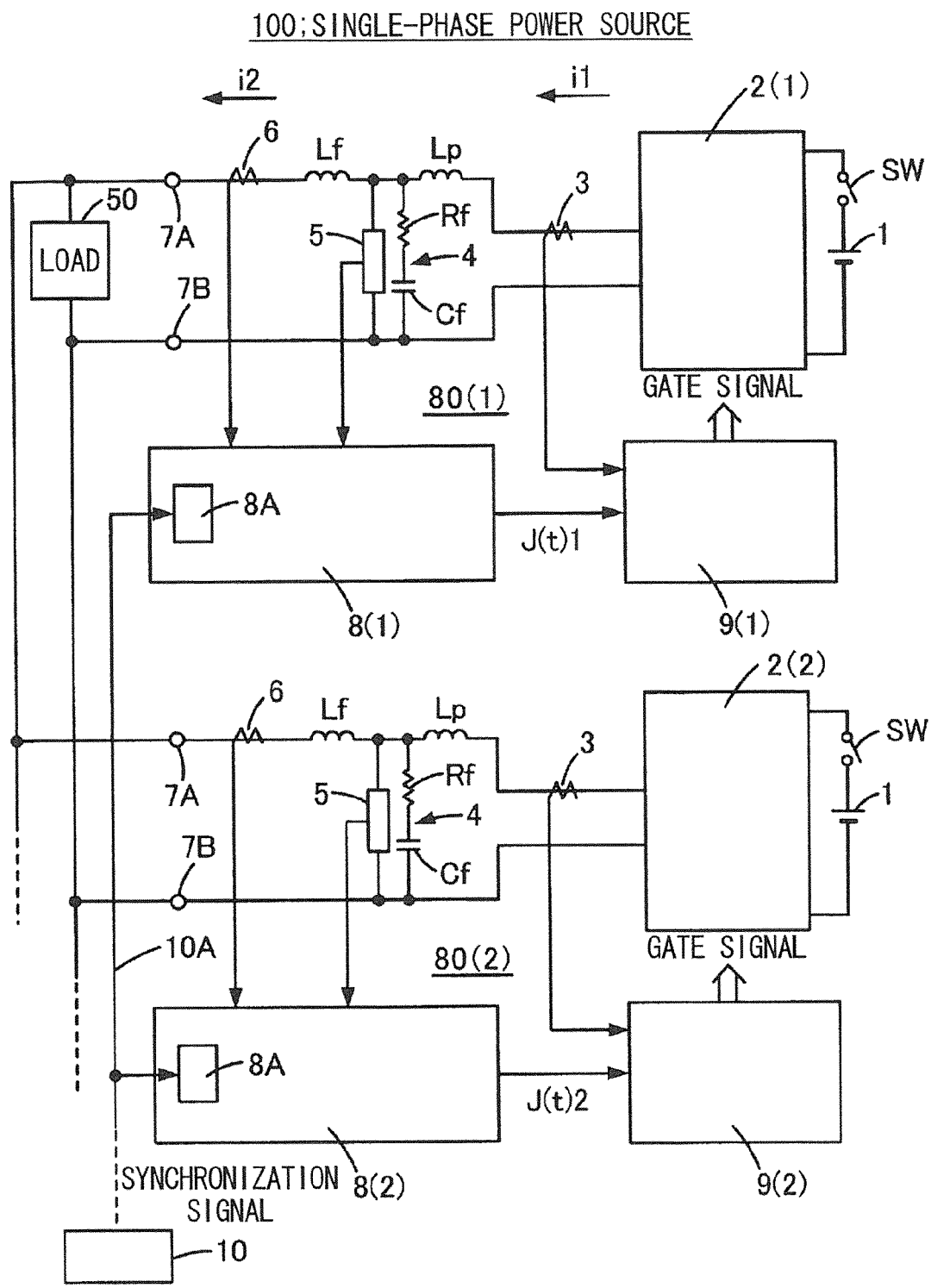
FIG. 3 is a drawing to show a block configuration of the single-phase power source 100 in which a plurality of error-tracking-mode single-phase inverters 80 is connected in parallel in Embodiment 1 that relates to the present invention.

A description of a preferred embodiment 1 to implement the present invention is explained hereafter with reference to FIG. 1 through FIG. 3. FIG. 1 is a drawing to explain a constantly-sampled error-tracking-mode single-phase AC inverter 80 that is one embodiment of the inverter that has the ability to control equivalent output impedance by only the control parameter adopted by the present invention, and FIG. 2 is a drawing to show one example of the power efficiency of the inverter 80. FIG. 3 is a drawing to explain the single-phase AC power source 100 that is one embodiment of the present invention made by connecting N units of inverters 80 in parallel. First, the constantly-sampled error-tracking single-phase AC inverter 80 consisting of a single-phase inverter is explained with reference to FIG. 1, and the inverter 2 is connected to both ends of the DC power source 1. The DC power source 1 is a common type such as, for example, a rectifier that converts AC to DC by commutating the voltage of a commercial AC power source, a solar array panel, or the like. The inverter 2 is the inverter for a single-phase consisting of semiconductor elements S1 through S4 such as 4 IGBT's constructed in a bridge connection, and diodes D1 through D4 that are connected in parallel in reverse polarity respectively to the semiconductor elements. However, the inverter 2 is not limited to a bridge construction, and which may be, for instance, a single-phase inverter of the half bridge type connecting two semiconductor elements and two condensers such as IGBT or MOSFET in a bridge construction, or an inverter of the inverter single-phase voltage doubler type made of a single-phase doubler voltage construction by connecting inline two DC power sources 1 as shown in Japanese Patent Application First Publication No. 2001-177997. In addition, a power supply switch SW is provided between the DC power source 1 and the inverter 2.

The first electrical current detector 3 such as the current transmission (CT) to detect the inverter current i1 is provided at the AC side line L1 of the inverter 2, and a current holding inductor Lp is connected to the AC side line L1, and an output filter circuit 4 consisting of a filter resistance Rf, a filter condenser Cf, and filter inductor Lf, is connected between the load side of the current holding inductor Lp and AC side line L2. A filter voltage detector 5 is provided between end terminals where the filter resistance Rf and the filter condenser Cf are connected in series. The output filter circuit 4 is not limited to that composed of a filter resistance Rf, filter condenser Cf, and filter inductor Lf. Further, a second electrical current detector 6 such as the current transmission is provided to detect the output current i2 of the error-tracking-mode single-phase AC inverter 80 which flows through the filter inductor Lf. A load 50 is connected to the output terminals 7A and 7B of the error-tracking-mode inverter 80 as the external circuit. As shown in FIG. 3, the output terminals of another error-tracking-mode inverter that has the same construction are connected to the output terminals 7A and 7B in parallel. The load 50 is a common AC load to receive the electrical power supply, or a common DC load to receive the electrical power supply and the rectifier circuit, or a common DC load to receive the voltage inverter, rectifier circuit and electrical power supply; and the inverter 80 is capable of power feeding various loads.

This constantly-sampled error-tracking-mode inverter 80 provides a microcomputer MC for comprehensive controlling. The microcomputer MC comprises an electric current reference value formation unit 8 to form an electric current target function signal J(t) by performing a prescribed process for an output current detection signal and an output voltage detection signal to be described hereinafter; a gate command/PWM control unit 9 to select a switching mode of the semiconductor elements S1 through S4 of the inverter 2 from the electric current target function signal J(t) and the inverter current detection signal; and an output monitoring and gain modification unit 10 to perform the prescribed gain modification by monitoring the output electrical power of the constantly-sampled error-tracking-mode inverter 80. The A/D converter circuit for converting each detection signal from analog to digital (A/D) is omitted in this drawing.

The electric current reference value formation unit 8 comprises: a voltage command means 8A for providing the reference voltage Va represented by a standard sine wave voltage in which the polarity changes to positive or negative at every 180°; an electric current gain means 8B for multiplying the electric current feed forward gain β that is one of the control parameters to the electric current detection signal Δi2 of the output current i2 detected by the second electric current detector 6; a first subtraction means 8C for subtracting the voltage detection value Δv1 of the inverter voltage v1 detected by the inverter voltage detector 5 from the reference voltage Va; a voltage gain means 8D for multiplying the feedback gain α that is the other control parameter to the subtraction voltage; and a second addition means 8E for creating the electric current target function signal J(t) by adding the current signal that corresponds to the voltage value multiplied by the voltage feedback gain α, and the current signal multiplied by the electric current feed forward gain β.

The voltage command means 8A provides the reference voltage Va that is the standard sine wave voltage (Esinωt) which changes positive or negative at 180° by synchronizing with the synchronized signal from outside the error-tracking-mode single-phase AC inverter 80, or creates the reference voltage Va represented by a standard sine wave voltage (Esinωt) of a prescribed frequency. This standard sine wave voltage (Esinωt) determines the output frequency of the error-tracking-mode single-phase AC inverter 80. For instance, if the output frequency of the error-tracking-mode single-phase AC inverter 80 is 50 Hz, the standard sine wave voltage (Esinωt) is determined to be 50 Hz. The reference voltage Va represented by the standard sine wave voltage is significant for parallel operation of the error-tracking-mode single-phase AC inverter, and a synchronized signal is generated by a cycle that determines each individual cycle of the standard sine wave voltage. The reference voltage Va is provided as the digital value that corresponds to the instantaneous value of the standard sine wave voltage (Esinωt). When a plurality of inverters are operated in parallel, this standard sine wave voltage (Esinωt) may be mutually synchronized by synchronizing with external compatible synchronization signals, or the voltage command means 8A of each inverter may also have mutually equal frequencies while generating a reference voltage Va of the standard sine wave waveform at the same time while following up. In addition, the reference voltage Va is not necessarily a sine wave.

The electric current gain means 8B provides Δi2·β by multiplying the electric current feed forward gain β that is the control parameter to the electric current detection value Δi2 of the output current i2 of the error-tracking-mode single-phase AC inverter 80 detected by the second current detector 6. This electric current feed forward gain β is the current gain so that the output voltage is not changed by the output current, and which becomes a significant factor of the present invention to be described hereinafter. The present invention also has the ability to set the electric current feed forward gain β by a sequence. In addition, the electric current detection value Δi2 of the output current i2 in the present embodiment is the digital value which corresponds to the instantaneous value being sampled at short regular time intervals. Although the voltage feedback gain α that is the control parameter is a larger value than zero and the electric current feed forward gain β is mostly smaller than 1, when it is larger than 1, a negative equivalent output impedance can be realized.

The subtraction means 8C finds the difference by subtracting a digital value which corresponds to the instantaneous value obtained by sampling the voltage detecting value Δv1 of the inverter voltage v1 at short regular time intervals, from the reference voltage Va. The subtraction result is expressed by (Va−Δv1). Therefore, the signal of the output side of the voltage gain means 8D becomes (Va−Δv1)·α in which the voltage feedback gain α is multiplied to (Va−Δv1). This voltage feedback gain α also is the voltage gain value which can be set to the optimal value according to the sequence similar to the current feed forward gain β, and the voltage feedback gain α and the current feed forward gain β are extremely significant factors in determining the equivalent output impedance of the inverter in the present invention which is described later. The addition means 8E creates the electric current target function signal J(t) by adding the Δi2·β from the current gain means 8B, and (Va−Δv1)·α from the voltage gain means 8D. And then, the electric current target function signal J(t) is given to the gate signal and PWM control unit 9.

The gate signal and PWM control unit 9 in the microcomputer MC comprises a subtraction means 9A to subtract the electric current target function signal J(t) from the current detecting value Δi1 of the inverter current i1 detected by the first current detector 3. This current detecting value Δi1 is also the digital value which corresponds to the instantaneous value being sampled at short regular time intervals as described above. Therefore, the subtraction means 9A derives the error signal Δt by calculating (Δi1−J(t)). This error signal is input into the gate command and PWM circuit 9B, and the gate command and PWM circuit 9B selects a gate into which one of the semiconductor elements S1 through S4 of the inverter 2 is provided as follows.

The gate command and PWM circuit 9B executes a gate command according to the polarity of the difference between the electric current detection signal Δi1 of the inverter current i1 and the electric current target function signal J(t). The gate command is as follows. When Δt=Δi1−J(t) is negative, a switching mode to increase the current is selected because the inverter current i1 is less than the reference value. When Δt=Δi1−J(t) is positive, a switching mode to reduce the current is selected because the inverter current i1 is larger than the reference value. So, the error-tracking-mode type PWM control selects a switching mode according to the polarity of the error signal Δt as follows:

(1) When Δt=Δi1−J(t)≦0 with the switching mode 1, the semiconductor elements S3 and S4 are on, and the semiconductor elements S1 and S2 are off.

(2) When Δt=Δi1−J(t)>0 with the switching mode 2, the semiconductor elements S1 and S2 are on, and the semiconductor elements S3 and S4 are off.

(3) There is a reflux flow mode in which electrical power supply is not performed from the DC power source 1 with the switching mode 3, and in this case, the semiconductor elements S1 and S4 are on, and the semiconductor elements S2 and S3 are off, or the semiconductors elements S2 and S3 are on, and the semiconductor elements S1 and S4 are off.

The semiconductor elements S1 through S4 of the inverter 2 may be on or stay in an off state based on the gate command from the gate command and PWM circuit 9C determined according to the polarity of the error signal Δt. For instance, when the state of Δt=Δi1−J(t)≦0 continues, the semiconductor elements S1 and S2 stay in an on state, and the semiconductor elements S3 and S4 stay in an off state until becoming Δt=Δi1−J(t)>0. This point is different from the switching operation of the PWM control by the triangular wave (sawtooth wave) comparative system which is used commonly.

As is well known, the power source is generally expressed by the equivalent circuit equivalent output impedance with the voltage source as viewed from the output end. If, the equivalent output impedance is 0, the power source becomes ideal in which the output end voltage does not change despite how much current is applied. In reality, the equivalent output impedance does not become 0, and which is regarded as not controlled freely. For finding the equivalent output impedance, voltage drop by the equivalent output impedance is 0 because the current is not applied when the output end is opened (at the time of non-load) first. Therefore, the voltage Vo at the time of non-load becomes the output voltage of the voltage source. Next, because the voltage difference between the output voltage Vc at the time of connecting a load having impedance X and a non-load voltage Vo results in a voltage drop due to equivalent output impedance, when making the voltage that flows at such time to be I, the relationship of Vo−Vc=XI results. Accordingly, the equivalent output impedance Z becomes Z=(Vo−Vc)/I=(Vo−VC)X/Vc.

The feature in the constantly-sampled error-tracking-mode inverter is that the current amplifier characteristic of the inverter can be expressed in a mathematical formula, and the equivalent output impedance can be calculated by adopting the upper level control (control using the current target formation means) which is suitable to the error-tracking-mode PWM. The equivalent output impedance Z of the inverter 2 viewed from the output filter 4 is constructed by the resistance and capacitor. The total resistance value decreases linearly in relation to the increase in the current feed forward gain β that is the control parameter, and which is inversely proportional to the voltage feedback gain α that is the control parameter. In most cases, the capacitance within the equivalent circuit is arranged in parallel with a low resistance, and the equivalent output impedance Z of the inverter 2 can be considered as the resistance element because the time constant is negligibly short in comparison with the frequency element of the main circuit current. Given this situation, when the current gain of the inverter 2 is G, the equivalent output impedance Z of the inverter 2 becomes nearly equal to the DC resistance which is expressed by the formula $(1−β·G)/(α·G)[Ω]$. Here, the current gain G of the inverter 2 is the value determined by the dead time of the inverter 2, DC voltage, AC voltage, and so forth, and in most cases result in about 0.99, and this value can potentially approximate 1. In addition, the current gain G cannot be derived through calculation, and which is the inverter specific value derived by an actual measurement. However, the current gain G becomes a nearly equal value in an inverter which has the same circuit construction and the electrical property is nearly the same.

Accordingly, an inverter having an equivalent output impedance Z which is nearly equal to the resistance value expressed by the formula of $(1-\beta \cdot G)/(\alpha \cdot G)[\Omega]$, in other words, the equivalent output impedance Z which is nearly equal to the resistance value expressed by the formula of $(1-\beta \cdot G)/(\alpha \cdot G)[\Omega]$ can be efficiently larger by sufficiently reducing the output current feed forward gain $\beta$ and the output voltage feedback gain $\alpha$ in the constantly-sampled error-tracking-mode single-phase AC inverter. For instance, when the output current feed forward gain $\beta$ and the output voltage feedback gain $\alpha$ are set so that the current gain G approaches 1 and $\beta=\alpha=10-5$, the equivalent output impedance Z becomes nearly 100 k$\Omega$, and when the output voltage is 200V, the output can be near zero because the output current becomes 2 mA at maximum, and the output is about 0.4 W. Further, when the output current feed forward gain $\beta$ and the output voltage feedback gain $\alpha$ are set so that $\beta=\alpha=10-4$, the equivalent output impedance Z becomes nearly 10 k$\Omega$ and the output current becomes 20 mA at maximum. Furthermore, when the output current feed forward gain $\beta$ and the output voltage feedback gain $\alpha$ are set so that $\beta=\alpha=10-2$, the equivalent output impedance Z becomes nearly 100 k$\Omega$ and the output current becomes 2 A at maximum. Moreover, when the output current feed forward gain $\beta$ and the output voltage feedback gain $\alpha$ are set so that $\beta=0.5$, $\alpha=0.1$, the equivalent output impedance Z becomes nearly 5 k$\Omega$ and the output current becomes 40 A at maximum. Accordingly, it is understood that an arbitrary equivalent output impedance Z, output current and output electric power can be obtained by controlling the output current feed forward gain $\beta$ and the output voltage feedback gain $\alpha$ in the constantly-sampled error-tracking-mode inverter. In Embodiment 1, this inverter 80 is used as a storage battery, uninterruptible power supply (UPS) used for a communication device having a filter condenser, or the like.

Through the setting of such equivalent output impedance Z, even when a normal constantly-sampled error-tracking-mode pulse width modulation is performed, only an initial current of less than the acceptable value flows, and a large quantity of inrush current does not flow as with the conventional method because the equivalent output impedance is initially large to the extent of reliably limiting the inrush current to be below the acceptable value. Here, the prescribed electric current target function signal J(t) is the value that corresponds to, for instance, a rated current. Accordingly, separately from changing the equivalent output impedance, for instance, a sequence is certainly acceptable in which an initial current is set to a value that has the ability to limit below the acceptable value for only a fixed set time and then return to the value in normal operation after the set time has elapsed.

Further, much the same is true on a normal charge and discharge repetition operation for a condenser in a high capacity excimer laser device. In this case, the power supply switch SW remains on. Although the illustration is omitted, when the load 50 is a condenser and a rectifier circuit, there is no inrush current by initiating the operation of the inverter 100 and initiating charging after the output current feed forward gain $\beta$ and the output voltage feedback gain $\alpha$ are set first to be a small value before initiating charging so as to have the equivalent output impedance Z of the inverter 2 to be a large value in which the current at charge initialization can be limited to be below the acceptable value. And after the preset time, when a sequence is set so that the output current feed forward gain $\beta$ and the output voltage feedback gain $\alpha$ are increased so as to have the value of the equivalent output impedance Z that allows the rated current to flow, even condenser charging can be possible by an easy control without lengthening the charging time. In addition, setting by a sequence such as the equivalent output impedance Z as stated above can be applied in exactly the same manner as when connecting inverters in parallel. The operational method as described above does not only suppress the inrush current at the time of start up, but also shows that adjustment of the output is possible by modifying the equivalent output impedance of the inverter by only adjusting control parameters such as the output current feed forward gain $\beta$ and the output voltage feedback gain $\alpha$. In addition, by making the output current feed forward gain $\beta$ a large value with negative polarity, the equivalent output impedance Z can be made to be a sufficiently large value in the present invention.

The error-tracking-mode single-phase AC inverter 80 shown in FIG. 1 becomes the master inverter when a plurality of units are connected in parallel, so the microcomputer MC comprises an output monitoring and gain modification unit 10 to perform the prescribed gain modification by monitoring the output electrical power in every error-tracking-mode single-phase AC inverter that is connected in parallel. When another microcomputer is provided separately to comprehensively monitor and control the entire electrical power system, this output monitoring and gain modification unit 10 may be built into the microcomputer. The output monitoring and gain modification unit 10 calculates the output electrical power by receiving the detection value $\Delta v1$ detected by the inverter voltage detector 5 and the current detection value $\Delta v2$ detected by the second current detector 6 as digital values. Further, the output monitoring and gain modification unit 10 stores an efficiency characteristic that indicates the electrical power efficiency in relation to the output electrical power as shown in FIG. 2 as data in a storage unit not illustrated in the drawing. This efficiency characteristic is the result of calculation by operating and measuring the error-tracking-mode single-phase AC inverter 80 in advance. However, a control as described in the embodiment, although it is not illustrated, may be performed by calculating the input electrical power by sampling the voltage and current of the input side of the inverter 2, while finding the electrical power efficiency from the calculated input electrical power and the calculated output electrical power during the operation.

Each of the reference voltages Va of N units of the error-tracking-mode single-phase AC inverters 80(1), ... 80(N) that are connected in parallel must be mutually synchronized as stated above. A synchronized signal generator 11 provides a synchronized signal to each voltage command means 8A of the inverters 80(1) through 80(N) through the signal conductor 11A. In addition, when a large number of inverters are operated in parallel, by using an optical fiber for the signal conductor 11A and providing an optical synchronized signal to each inverter of each voltage command means 8A, a cross-current which flows between inverters can be reliably suppressed even in a large number of parallel units as they are not influenced by noise, and accurate control is achievable. Further, the synchronized signal generator 11 generates a synchronized signal every half cycle, whole cycle, or preset cycle of the prescribed standard sine wave voltage. In other words, a synchronized signal is generated at a cycle which determines each single cycle of the standard sine wave voltage as the reference voltage Va. Each voltage command means 8A generates a reference voltage Va represented by a standard sine wave voltage (Esinωt) in synch with the leading edge of each synchronized signal. Accordingly, the frequency of the output voltage of each inverter is the same as the frequency of the standard sine wave voltage (Esinωt), and the phase is also the same, so the amplitude of the output voltage cannot be significantly different in a normal state. In addition, the synchronized signal generator 11 can be omitted when the voltage command means 8A of each inverter mutually has an equal frequency, and generates a standard sine waveform signal which mutually synchronizes, and generates a standard sine waveform signal at the same time while mutually following up.

In the present invention, the error-tracking-mode single-phase AC inverters 80(1), ... 80(N) perform the PWM control by a synchronized constantly-sampled error-tracking-mode method; however, the size of the voltage of the error-tracking-mode single-phase AC inverter 80(1), ... 80(N), in other words, the amplitude, often differs. In this case, a portion of the output current tries to flow from an inverter of large amplitude of the output voltage into an inverter of small amplitude; however, in the present invention, because the error-tracking-mode single-phase AC inverters 80(1), ... 80(N) have an equivalent output impedance Z of a greater or equal value that can suppress cross-current to be an acceptable value or below, the more output current, the larger the voltage drop of the output filter circuit 4 becomes, and the output voltage of the inverter moves in a decreasing direction, so eventually error-tracking-mode PWM control is performed so that the output voltage becomes mutually equal into each inverter.

The preferred embodiment 1 comprises an inverter having the equivalent output impedance Z which is nearly equal to the resistance value expressed in the aforementioned formula $(1-\beta \cdot G)/(\alpha \cdot G)[\Omega]$, in other words, N units of the constantly-sampled error-tracking-mode single-phase AC inverters 80(1), ... 80(N) that have the same circuit construction and nearly the same electrical properties are connected in parallel as shown in FIG. 3, and the equivalent output impedance Z of each error-tracking-mode single-phase AC inverter shares the load power in a desired ratio, in other words, the voltage feedback gain $\alpha$ and the current feed forward gain $\beta$ of the control parameter are set so as to be the desired load sharing. Because the equivalent output impedance Z is an equivalent impedance, an actual electrical power loss does not occur. Accordingly, electrical power loss is not increased even when the equivalent output impedance Z is increased.

Currently, when N units of error-tracking-mode single-phase AC inverters 80(1), ... 80(N) in a single-phase AC power source 100 are operated near the rated output electrical power Pr shown in FIG. 2, the error-tracking-mode inverters 80(1), ... 80(N) can limit the cross-current to be an acceptable value or below, and the voltage feedback gain $\alpha$ and the current feed forward gain $\beta$ of the control parameter are set so as to have the impedance values Z which is able to flow the rated current sufficiently. For this condition, N units of the constantly-sampled error-tracking-mode inverters 80(1), ... 80(N) perform nearly equal load sharing. The load electrical power demand is assumed to decrease during such operation. Output data of N units of the constantly-sampled error-tracking-mode inverters 80(1), ... 80(N) is input in the output monitoring and gain modification unit 10, so the output monitoring and gain modification 10 first calculates the total demand load electrical power Wt from the output data. Next, when making the rated output electrical power Pr of N units of the error-tracking-mode inverters 80(1) ..., 80(N), a number of units m that satisfies the total demand load electrical power Wt is calculated. In other words, the number of units m that satisfies Pr·m>Wt>Pr·(m−1) is calculated. Here, the reason why the rated output electrical power Pr is used is because the highest power efficiency is generally found in the vicinity of the rated output electrical power, and even when replacing the rated output electrical power Pr by a lower limit Pu of the output electrical power corresponding to the acceptable limit value Xu of the power efficiency shown in FIG. 2, or replacing by an arbitrary electrical power value Pd between the rated output electrical power Pr and the limit value Pu of the output electrical power, operation within the range of the acceptable power efficiency is achievable.

When the number of units m is calculated, m units of error-tracking-mode inverters are kept operating. On the other hand, in regards to other than m units (N−m) of inverters, that is (N−m) units determined by the sequence, the equivalent output impedance Z is increased until a set maximum value Zm in order to substantially suspend them. The output monitoring and gain modification unit 10 gives a command to the microcomputer, not illustrated, of (N−m) units of error-tracking-mode inverters, and makes the electric current feed forward gain $\beta$ and the voltage feedback gain $\alpha$ that are the control parameters to reduce significantly until a preset value in relation to those electric current gain means 8B and the voltage gain means 8D in order to increase the equivalent output impedance Z until the set maximum value Zm. In addition, if the lower limit Pu of the output electrical power corresponding to the acceptable limit value Xu of the power efficiency shown in FIG. 2 is a value that is half or less of the rated electrical power Pr, high efficient parallel operation is achievable by operating with the number of units that satisfies the formula Pr·m>Wt>PR·(m−1) even with only a few operation units.

As stated above, the voltage feedback gain $\alpha$ is a value larger than zero, and the electric current feed forward gain $\beta$ is a value of 1 or less, and the electric current gain G is a numerical value that can approximate 1, so for instance, when setting in $\alpha=\beta=10-5$, because the equivalent output impedance Z is equal to the resistance value from the formula $(1-\beta \cdot G)/(\alpha \cdot G)[\Omega]$ as stated above, which becomes 105$\Omega$, in other words nearly 100 k$\Omega$. Here, when the rated output voltage Vr is 200V and the rated output current Ir is 20 A, the equivalent output impedance Z is nearly 100 k$\Omega$, so the maximum output current which actually flows is about 2 mA, and the output becomes 400 W or less. Because the rated output current is 4 kW, this output is negligibly small, and accordingly, can be considered to be a state of suspension. At that time, a shockless state of suspension can be realized in which the load is unaffected by surge voltage by modifying the electric current feed forward gain $\beta$ and the voltage feedback gain $\alpha$ that are the control parameters by taking more time than the preset time Ts without modifying them instantly. The preset time Ts is preferably about 3 times or more length of time of a cycle of the output voltage when operating independently and is not connected to a commercial AC electrical power system, or about 50 times or more length of time of a cycle of the commercial AC power source when connected to the commercial AC electrical power system.

When demand on the load electricity is further decreased during operation, the optimum number of units m for operation is calculated as stated above, and inverters are in effect put into a state of suspension by increasing the equivalent output impedance Z up to the set maximum value Zm for the remaining units of error-tracking-mode inverters. After creating a state of suspension, separation can be done without surge affecting the load while the electric power loss of those inverter devise can be zero by turning off the power supply switch for the inverters that are in a state of suspension, an in this way, power efficiency can be further improved. Thus, if the total demand for load electricity Wt increases, and the formula Pr·m>Wt>Pr·(m−1) is no longer able to be satisfied, and the number of units is n (N≧n>m) during the operation in which there are inverters in a state of suspension, when satisfying the formula of Pr·n>Wt>Pr·(n−1), the output monitoring and gain modification unit 10 gives a command to the microcomputer (not illustrated) of (n−m) units of the inverters from among the inverters in suspension mode, and the equivalent output impedance Z is returned to the value Zs by turning on the power supply switch SW first, and returning the electric current feed forward gain β and the voltage feedback gain α to the original state in relation to the electric current gain means 8B and the voltage gain means 8D. Preferably this impedance value Zs is a value which can limit the cross-current to be an acceptable value or below.

Closing of (n−m) units of the inverters are performed in order determined by the sequence, and feed is initiated. Accordingly, N units of the inverters operate by sharing the load electricity nearly evenly in a region of higher power efficiency than the acceptable limit value Xu of the power efficiency shown in FIG. 2 in this state. In this case, the electric current feed forward gain β and the voltage feedback gain α that are the control parameters are modified by preferably taking a longer time than the preset time Ts. In addition, the sequence to separate an inverter may cause suspension from the lower power efficiency devices, or the closing sequence may also be applied from the inverter of higher power efficiency. Further, if necessary, a correction value is found by measuring the power efficiency of the entire constantly-sampled error-tracking-mode power source in advance when the number of operation units is p ($1 \leq p \leq N$), and the correction value is stored in the microcomputer (not illustrated), and there is a case in which the number of units required for operation can be found more accurately by reflecting the correction value to the power efficiency of the aforementioned formula.

Further, when the total demand load electricity Wt supplies electric power to a load significantly suddenly such that it fluctuates with considerable frequency, the sudden increase on the power demand can be sufficiently responded to if the power supply switch SW of inverters in a state of suspension which are not in effect supplying power are kept on without turning off. However, if power efficiency is considered to be the first priority, the turning on and off of the power supply switch SW should be performed as stated above. Furthermore, when the load sharing of inverters in a parallel operational state are desired to be modified in accordance with the preset sequence, it can be realized by modifying the electric current feed forward gain β and the voltage feedback gain α, and in particularly the current feed forward gain β. Accordingly, load sharing can be modified and the prescribed load sharing can be easily realized by modifying the value of the equivalent output impedance Z as stated above.

In addition, the construction of an inverter 2, as an alternative to the aforementioned full bridge construction, may be a half bridge construction or a single-phase voltage doubler inverter which is composed as a single-phase voltage doubler by connecting two DC power sources 1 in a series; and an explanation of a half bridge construction or a single-phase voltage doubler inverter and a single-phase inverter that adopts constantly-sampled error-tracking technology having an equivalent output impedance Z expressed by the formula $(1-\beta \cdot G)/(\alpha \cdot G)$ is omitted in regards to these unit operations because the explanation is given in the patent reference documents presented above. Accordingly, load sharing can be modified easily and arbitrarily in these inverters in a similar manner as stated above. In addition, a voltage limiter, electric current limiter, and PWM control error correction means which controls the output signal such as the subtraction means 8C or addition means 8E in a prescribed range are omitted in Embodiment 1 because these are not directly related to the present invention; however, these means are necessary for performing preferable operation and more accurate control. This is also true for subsequent embodiments, and an explanation is given in a constantly-sampled error-tracking-mode three phase AC inverter described later in regards to the voltage limiter, electric current limiter, or the PWM control error correction means. In addition, the present invention can set the equivalent output impedance Z to be a set maximum value Zm easily by making the electric current feed forward gain β to be a negative large value.

Embodiment 2

Figure 4:
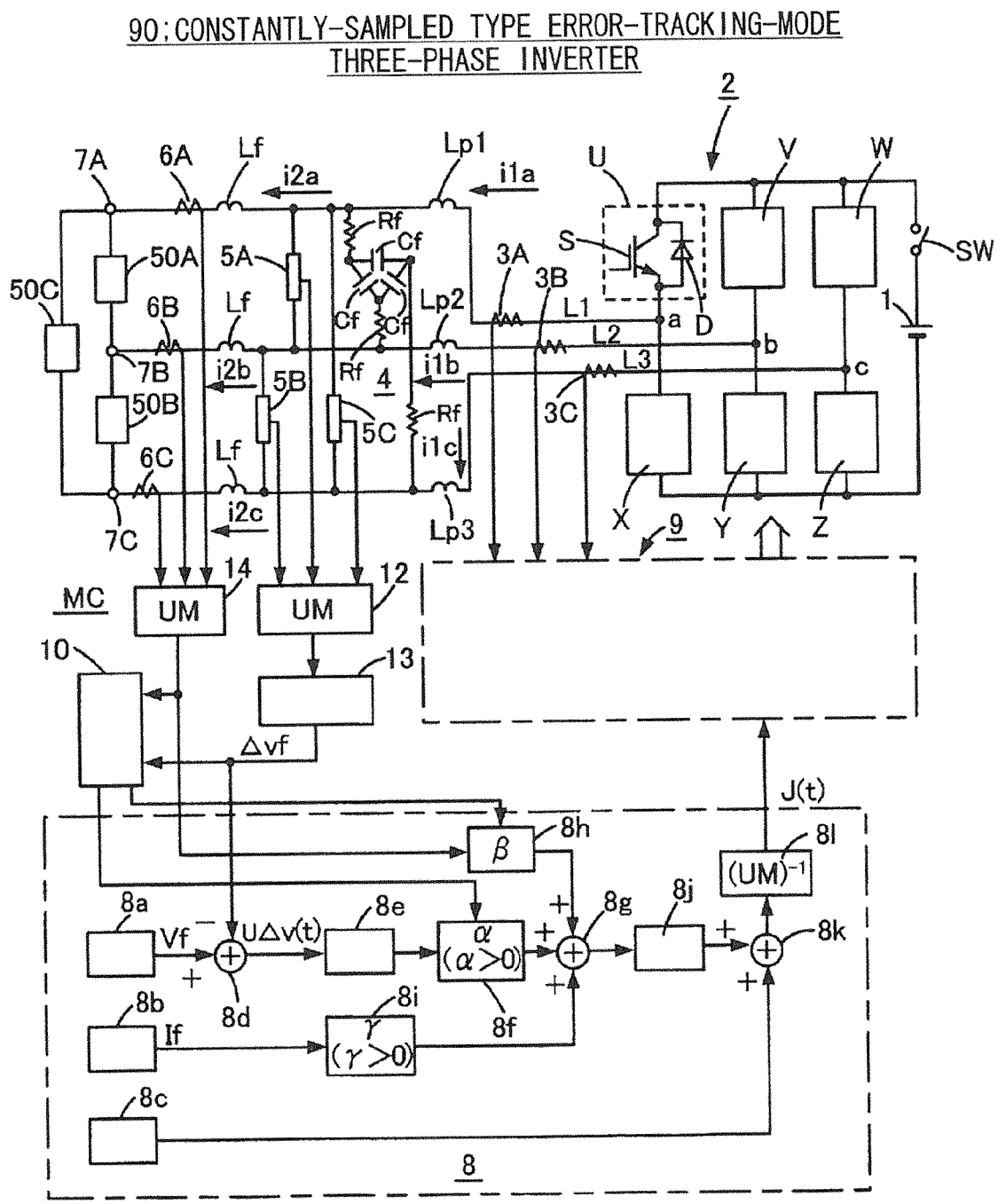
FIG. 4 is a drawing to show the constantly-sampled error-tracking-mode three-phase inverter 90 used in Embodiment 2 that relates to the present invention.
Figure 5:
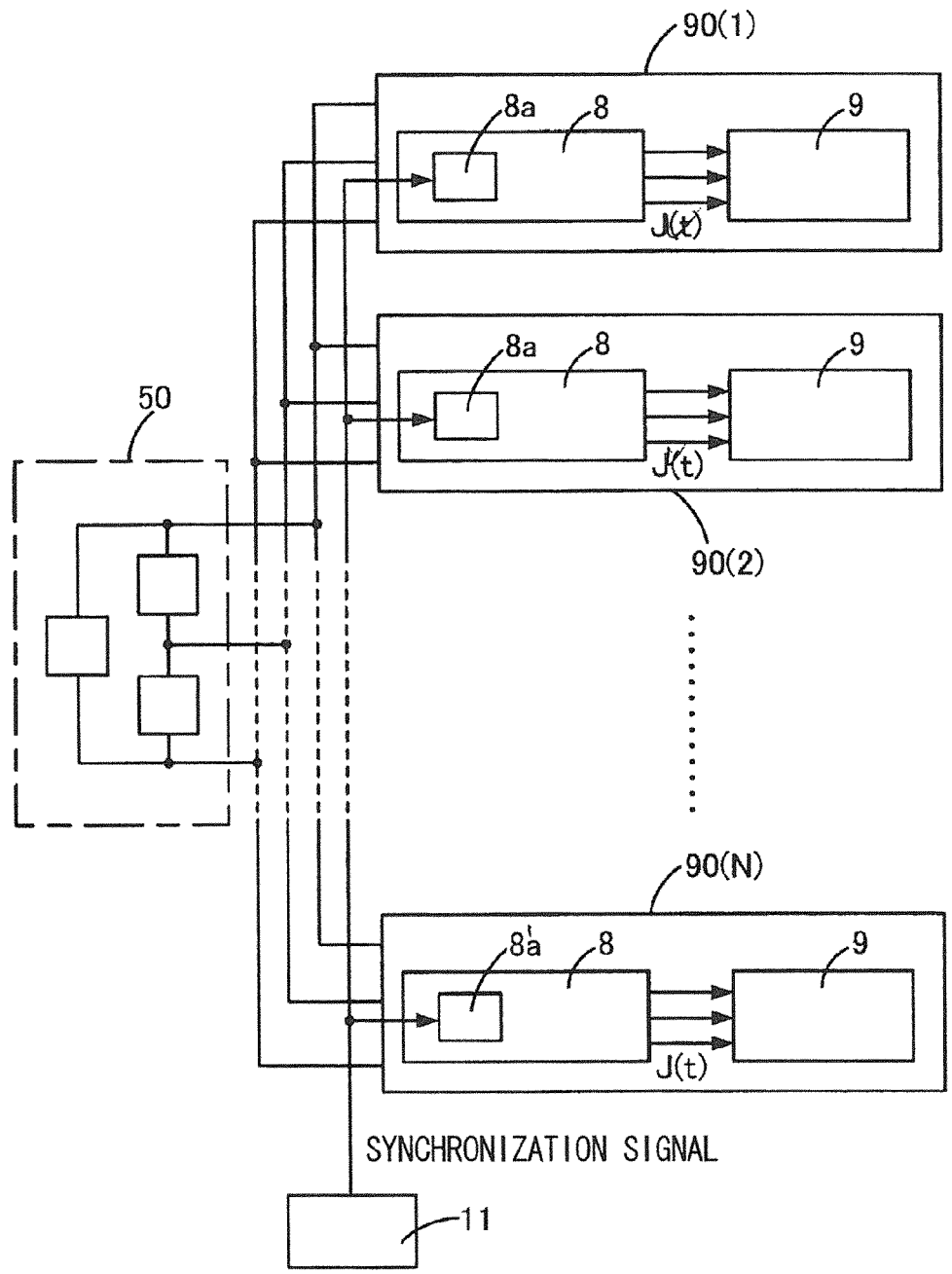
FIG. 5 is a drawing to show a block configuration of the three-phase power source 200 in which a plurality of error-tracking-mode single-phase inverters 90 is connected in parallel in Embodiment 2 that relates to the present invention.

In the aforementioned embodiment, explanations are given in regards to the error-tracking-mode inverters of a single-phase construction with the error-tracking-mode power source in which those inverters are connected in parallel, as well as the closing and interrupt (suspended) thereof; and because the limiting of the cross-current in the constantly-sampled error-tracking-mode power source in which a plurality of three-phase AC error-tracking-mode inverters are connected in parallel is also performed likewise, an explanation is given in regards to a three-phase AC power source 200 composed of a plurality of three-phase AC error-tracking-mode inverters 90 connected in parallel with reference to FIG. 4 and FIG. 5. The reference numerals which are the same as those used in FIG. 1 or FIG. 3 indicate the same names in FIG. 4 and FIG. 5. This Embodiment 2 also uses a microcomputer MC, and each analog detection signal is converted to a digital detection signal, and digital processing is performed subsequently for each processing although an A/D converter circuit is not shown specifically.

A three-phase AC inverter 2 is an inverter for three phases by comprising in a three phase full bridge construction: a semiconductor element S represented by a self arc extinguishing voltage drive element such as MOSFET or IGBT; and six switch elements U, V W, X, Y, and Z consisting of diode D which are connected in parallel in reverse direction to the semiconductor element S. L1 is a line connecting to an interconnection point a of the switch elements U and X; L2 is a line connecting to an interconnection point b of the switch elements V and Y; and L3 is a line connecting to an interconnection point c of the switch elements W and X. The electric current detectors 3A, 3B, and 3C are provided to detect the inverter currents i1a, i1b, and i1c flowing through the lines L1, L2, and L3 respectively. The inductors Lp1, Lp2, and Lp3 for maintaining current are connected serially in each of Line L1, L2, and L3. An output filter circuit 4 is constructed by connecting an output filter circuit consisting of a filter resistance Rf, filter condenser Cf, and filter inductor Lf respectively between the lines L1 and L2, the lines L2 and L3, and lines L1 and L3. Further, the filter voltage detectors 5A, 5B, and 5C are provided to detect the voltage between the terminals of the filter resistance Rf and the filter condenser Cf in each phase. Of course, the output filter circuit 4 for three-phase AC may be another circuit construction in which the filter resistance Rf is not included.

Further, the output current detectors 6A, 6B, and 6C are provided to detect the output current i2a, i2bm and i2c of each phase, and a load 50A is connected between the output terminals 7A and 7B, and a load 50B is connected between the output terminals 7B and 7C, and a load 50C is connected between the output terminals 7A and 7C respectively. In addition, the electric current detector for one phase and the filter voltage detector for one phase, for instance 3B, 6B, and 5B can be omitted. A constantly-sampled error-tracking-mode three-phase AC inverter 90 shown in FIG. 4 is also indicated to be the master inverter when a plurality of units are connected in parallel, so a microcomputer MC comprises, as in the case of the single-phase: an electric current reference value formation unit 8 which generates the electric current target function signal J(t) by performing the prescribed processing described later to the output current detection signal and the output voltage detection signal; a gate signal and PWM control unit 9 to select a switching mode of semiconductor elements S1 through S6 of the three-phase AC inverter 2 from the electric current target function signal J(t) and the inverter current detection signal and performs the pulse width modulation (PWM); and a output monitoring and gain modification unit 10 to perform prescribed control by monitoring the output electric power of the entire three-phase AC error-tracking-mode AC inverters 90(1), 90(2), . . . 90(N) that are connected in parallel. Further, the error-tracking-mode three-phase AC inverter 90 comprises a dq conversion means 12 having a dq conversion matrix U to be described hereinafter, a low-pass filter 13, and a dq conversion means 14 having a dq conversion matrix U. In addition, the output monitoring and gain modification unit 10 may be provided separately in a microcomputer when the microcomputer is provided to comprehensively monitor and control the electric power system.

Next, an explanation in regards to the operation of the error-tracking-mode three-phase AC inverter 90 is given while describing an electric current reference value formation unit 8 or the like. The electric current reference value formation unit 8 has a filter voltage command means 8*a* to output the reference voltage value Vf made by the dq conversion of the target voltage value of the terminal voltage of the filter condenser Cf, which herein is a command value of a three-phase balanced AC voltage which becomes the target voltage for output. A simple explanation is given herein regards to dq conversion, and dq conversion is often used when dealing with the three-phase AC inverter, and which converts the voltage and the current of the three-phase AC to a value on the dq axis (rotating coordinate system) which is synchronized with the power source voltage, and three-phase AC can be treated in a similar manner with DC by performing a dq conversion. The condenser current command means 8*b* provides a DC current command value in order to correct the electric current flowing into the filter condenser Cf. On the assumption that the voltage of the filter condenser Cf is in the DC reference voltage value Vf, the electric current flowing to the filter condenser Cf at that time is found by calculation in advance, and a correction is made by adding the electric current command so as to be the electric current. In other words, this is basically the same with feed forwarding the electric current which flows to the load. Here, because the d axis current is the active current and the q axis current is the reactive current, the reference voltage value Vf is only the d axis element and the electric current command value If is only the q axis element in the dq coordinate for a condenser. Further, a PWM electric current error compensation means 8*c* is to correct a difference to zero because the difference is generated in the output current in relation to the electric current command value If in the error-tracking-mode PWM.

The detected voltage detected by the filter voltage detectors 5A, 5B, and 5C is dq converted by a coordinate conversion means 12 having the matrix UM (the matrix U is the rotating matrix, and the matrix M is a three-phase-two-phase conversion matrix. Formula (1)) to perform the dq conversion after three-phase to two-phase conversion, and then, the high frequency wave element is removed through the low-pass filter 13, and it is input to the subtraction means 8*d* as the signal Δvf as well as input to the output monitoring and gain modification unit 10. The subtraction means 8*d* outputs (Vf−Δvf) =UΔv(t) in which Δvf is subtracted from the voltage command value Vf of the filter voltage command means 8*a*. This value UΔv(t) is controlled in the prescribed range set by the voltage limiter 8*e*, and which is added to the addition means 8*g* by a voltage feedback means 8*f* after multiplying by the voltage feed back gain α that is one of the control parameters. In the meantime, after an electric current detection signal of the output currents i2*a*, i2*b*, and i2*c* detected by the second electric current detectors 6A, 6B, and 6C is dq converted as stated above by the coordinate conversion means 14 having the matrix UM which performs the dq conversion, it is then added to the addition means 8*g* after multiplying by the electric current feed forward gain β that is the other control parameter by the electric current gain means 8*h*. Further, the electric current detection signal of the output currents i2*a*, i2*b*, and i2*c* is also input to the output monitoring and gain modification unit 10.

$$U \equiv \begin{pmatrix} \sin\omega t, & -\cos\omega t \\ \cos\omega t, & \sin\omega t \end{pmatrix}, M \equiv \sqrt{\frac{2}{3}} \begin{pmatrix} 1, & -\frac{1}{2}, & -\frac{1}{2} \\ 0, & \frac{\sqrt{3}}{2}, & -\frac{\sqrt{3}}{2} \end{pmatrix} \quad (1)$$

ω: angular frequency(rad/s) of the filter voltage command

The electric current command value If from the condenser electric current command means 8*b* is added to the addition means 8*g* after multiplying by an electric current feed forward gain γ. Here, the electric current feed forward gain β is a numerical value of 1 or less, or which is larger than 1 when the equivalent output impedance Z is negative, and the voltage feedback gain α and the electric current feed forward gain γ are larger than 0. Further, a signal composed by adding an electric current signal, an electric current signal (sic), and the electric current command signal which correspond to the voltage value, is controlled in the preset range by the signal limiter 8*j*, and added to the electric current compensation value Ic from the PWM electric current error compensation means 8*c* at the addition means 8*k*, and processed by the coordinate conversion means 8I having the matrix (UM)−1 which performs a reverse coordinate conversion, and which is provided to the gate signal and PWM control unit 9 as the electric current function signal J(t).

In the meantime, the inverter electric currents i1*a*, i1*b*, and i1*c* which flow through each line of L1, L2, and L3 are detected by the electric current detector 3A, 3B, and 3C respectively, and those electric current detection signals are input to the gate signal and PWM control unit 9. At the gate signal and PWM control unit 9, an error signal Δt in which those electric current detection signals are subtracted from the electric current target function signal J(t) is found, and the gate command is performed according to the polarity of the error signal Δt, in other words, a switching mode is selected in a similar manner with the single-phase inverter. The basic switching modes in the three-phase AC inverter, in other words the gate commands, are the following 6 types.

The lines L1, L2, and L3 are regarded as an a-phase, b-phase, and c-phase, and the differences between the electric current target function signal J(t) and the electric current i1*a*, i1*b*, and i1*c* which flow in each phase are Δa≧, Δb<, and Δc.

(1) Switch mode 1 is when Δa≧0, Δb<0, and Δc<0. At that time, the switch elements U, Y, and Z are in an ON state, and the switch elements V, W, and X are in an OFF state, and the electric current flowing through the inductor Lp1 for the a-phase electric current maintenance increases.

(2) Switch mode 2 is when $\Delta a \geqq 0$, $\Delta b \geqq 0$, and $\Delta c<0$. At that time, the switch elements U, V, and Z are in an ON state, and the switch elements W, X, and Y are in an OFF state, and the electric current flowing through the inductor Lp1 for the a-phase electric current maintenance and Lp2 for the b-phase electric current maintenance increase.

(3) Switch mode 3 is when $\Delta a<0$, $\Delta b \geqq 0$, and $\Delta c \geqq 0$. At that time, the switch elements V, X, and Z are in an ON state, and the switch elements U, W, and Y are in an OFF state, and the electric current flowing through the inductor Lp2 for the b-phase electric current maintenance increases.

(4) Switch mode 4 is when $\Delta a<0$, $\Delta b \geqq 0$, and $\Delta c \geqq 0$. At that time, the switch elements V, W, and X are in an ON state, and the switch elements U, Y, and Z are in an OFF state, and the electric current flowing through the inductor Lp2 for the b-phase electric current maintenance and Lp3 for the c-phase electric current maintenance increase.

(5) Switch mode 5 is when $\Delta a<0$, $\Delta b<0$, and $\Delta c \geqq 0$. At that time, the switch elements W, X, and Y are in an ON state, and the switch elements U, V, and Z are in an OFF state, and the electric current flowing through the inductor Lp3 for the c-phase electric current maintenance increases.

(6) Switch mode 6 is when $\Delta a \geqq 0$, $\Delta b<0$, and $\Delta c \geqq 0$. At that time, the switch elements U, W, and Y are in an ON state, and the switch elements V, X, and Z are in an OFF state, and the electric current flowing through the inductor Lp1 for the a-phase electric current maintenance and Lp3 for the c-phase electric current maintenance increase.

Further, by the gate command performed according to the polarity of the error signals $\Delta a$, $\Delta b$, and $\Delta c$, the constantly-sampled error-tracking-mode three-phase AC inverter 90 controlled so as to make the error signals $\Delta a$, $\Delta b$, and $\Delta c$ 0, have the equivalent output impedance Z that is nearly equal to the resistance value expressed by the formula $(1-\beta \cdot G)/(\alpha \cdot G)$ [$\Omega$] in a similar manner with the inverter of the aforementioned Embodiment. Accordingly, a common synchronized signal of each constantly-sampled error error-tracking-mode three-phase AC inverter in which two or more of such error-tracking-mode three-phase AC inverters 90 are connected in parallel as shown in FIG. 5 is provided to the coordinate conversion means 8d, 8j, and 8p respectively, and each inverter is synchronized.

Accordingly, all of the three-phase AC inverters 2 can also be operated by synchronization in Embodiment 2, by connecting in parallel three-phase AC inverters having equivalent output impedance Z that is nearly equal to the resistance value expressed by the formula of $(1-\beta \cdot G)/(\alpha \cdot G)[\Omega]$, in other words, by connecting N units of the constantly-sampled error-tracking-mode three-phase AC inverters 90 having the same circuit construction and nearly the same electrical properties, in parallel in a similar manner with Embodiment 1 shown in FIG. 3, and setting the voltage feedback gain $\alpha$ and the electric current feed forward gain $\beta$ that are the control parameters so as to be the resistance value in which cross-current can be controlled to be an acceptable value or below. If the load electricity demand is decreased during such operation, because the dq converted output data of N units of the constantly-sampled error-tracking-mode three-phase AC inverters 90(1), 90(2), . . . 90(N) is input into the output monitoring and gain modification unit 10, the output monitoring and gain modification unit 10 first calculates the total demand load electricity Wt from the output data. Subsequently, when making the rated output electric power Pr of the N units of the constantly-sampled error-tracking-mode three-phase AC inverters 90(1), 90(2), . . . 90(N), it calculates the number of units m that can satisfy the total demand load electricity Wt, in other words, it calculates the number of units m which satisfies $Pr \cdot m > Wt > Pr \cdot (m-1)$. The reason why the rated electric power Pr is used here is because the vicinity of the rated electric power generally has the highest power efficiency, and when the rated electric power Pr is replaced to the lower limit value Pu of the output electric power which corresponds to the acceptable limit value Xu of the power efficiency shown in FIG. 2, or even when the rated electric power Pr is replaced to any electric power value Pd between the rated electric power Pr and the lower limit value Pu of the output electric power, the operation can be realized within the range of the acceptable power efficiency. In addition, an explanation is omitted in regards to the load sharing at the time of increasing the load electricity demand because this is similar to the constantly-sampled error-tracking-mode single-phase AC inverter 80 of Embodiment 1. Furthermore, the present invention can be applied in quite the same manner when the output voltage of the three-phase inverter is used as a sine wave having a different 180° phase, in other words, used as the single-phase three line voltage.

Furthermore, Embodiment 2 can also limit cross-current by connecting in parallel two or more of the constantly-sampled error-tracking-mode inverters 90 having the same circuit construction and nearly the same electrical properties which is an example of the three-phase inverter having an equivalent output impedance Z expressed by the formula $(1-\beta \cdot G)/(\alpha \cdot G)$, and setting the output voltage feedback gain $\alpha$ and the output electric current feed forward gain $\beta$ that are the control parameters so as to have the equivalent output impedance Z which can suppress the cross-current to be an acceptable value or below, and particularly setting the output electric current feed forward gain $\beta$ by adjusting at the same time as synchronizing all inverters. Because all inverters connected in parallel have the equivalent output impedance Z to the extent given above in which the cross-current can be suppressed to be an acceptable value or below in the constantly-sampled error-tracking-mode three-phase AC inverter 90 as in the case of a single-phase, the voltage drop of the filter circuits 4A and 4B become larger as output current increases, and the output voltage of the inverter moves in the down direction, so the error-tracking-mode PWM control is performed so that the output voltage can be mutually equal to each of the inverters after all.

Moreover, even in a case in which the power source 200 in which a large number of units of the constantly-sampled error-tracking-mode three-phase AC inverters 90 are connected in parallel, the cross-current can be limited to be an acceptable value or below according to the present invention without performing the particular control in order to suppress the cross-current. An electric power loss in effect does not occur because the equivalent output impedance Z here is the equivalent impedance; however, when making the equivalent output impedance Z larger, the deterioration of the output voltage becomes larger even though the cross-current can be suppressed to a small value. Accordingly, the equivalent output impedance Z of each three-phase AC inverter is preferred to be a value in which each three-phase AC inverter can sufficiently flow the rated current, and the cross-current can be limited to be an acceptable value or below. The equivalent output impedance Z of each three-phase AC inverter is set at nearly the same value when load sharing is equalized, and the equivalent output impedance Z value may not be the same when load sharing does not have to be equalized. Further, cross-current can be limited to be an acceptable value or below by setting the equivalent output impedance value suitably even when the output capacity of the inverters are not the same as described above. In addition, the equivalent output impedance Z of each three-phase AC inverter during the operation is preferred to be a value in which the rated current can flow sufficiently. Furthermore, the present invention can be applied in quite the same manner when the output voltage of the three-phase inverter is used as a sine wave having a different 180° phase, in other words, used as the single-phase three line voltage.

When an inverter during power feed requires a test, maintenance, or inspection to be performed, testing or maintenance and inspection may be performed after the equivalent output impedance Z of the applicable inverter is increased up to the maximum set value Zm, or after the power supply switch is turned off subsequent to the increase in the equivalent output impedance Z of the applicable inverter up to the maximum set value Zm; and by so doing, a shockless power feed suspension having little surge influence can be realized at the time of testing or maintenance and inspection. Further, on the other hand, when any inverter in a state of suspension regarding power feed initiates supply of output electric power, a shockless power feed initiation having little surge influence can be realized by reducing the equivalent output impedance Z of the applicable inverter which is set at the maximum set value Zm to be the equivalent output impedance Zs which is smaller than the maximum set value Zm by over a preset time.

This is the same for testing or maintenance and inspection, and the power supply switch is turned on when the equivalent output impedance Z of the inverter is at the maximum set value Zm, and then, the equivalent output impedance Z of the inverter may be reduced to a small value at the time of the operation by changing the voltage feedback gain α and the electric current feed forward gain β that are the control parameters by taking a longer time than the given set time without drastic modification. Further, when a condenser having a large capacity for such as a filter is included within the device or the load is capacitive, large inrush current flows at the time of turning on the power supply switch, so there is a need to take some sort of measure to prevent this. In the present invention, the equivalent output impedance is kept within a value in which large inrush current never flows, and by turning on the power supply switch in such a state, the inverter can be started in a normal condition without taking any special measures. Subsequently, the equivalent output impedance Z may be reduced to a value Zs at the time of normal operation according to the sequence. In addition, a microcomputer is used as the control device in the above embodiments; however, an individual analog circuit may also be combined.

Embodiment 3

The invention of Embodiment 3 shows, for instance, an inverter having the equivalent output impedance Z that is nearly equal to the resistance value expressed by the formula $(1-\beta \cdot G)/(\alpha \cdot G)[\Omega]$ shown in FIG. 1, and an inverter 100 consisting of the above constantly-sampled error-tracking-mode inverters (single-phase AC power sources) 80(1) and 80(2) which are connected in parallel as shown in FIG. 3, interrupts or closes one of the inverters in an operational state, or an embodiment in which the inverter 100 is opened (paralleled off) from the commercial AC electrical power system. Of course, three or more units of the constantly-sampled error-tracking-mode inverters may be connected in parallel. The following explanation can be applied in the case where three or more units of the constantly-sampled error-tracking-mode inverters are connected in parallel.

In FIG. 3, the standard sine wave voltage of each inverter 80(1), 80(2) in the inverter 100 are required to be mutually synchronized. The synchronized signal generation circuit 10 provides a synchronized signal to each voltage command means 8A of the inverters 80(1) and 80(2) through the signal line 10A. FIG. 2 shows an example where two units of inverters 80(1) and 80(2) are operated in parallel; however, as is made clear from the later description, one significant characteristic of the present invention is to enable treatment in the same manner with the case of two units even when a large number of units of inverters are operated in parallel. When a large number of units of inverters are operated in parallel, an optical fiber is preferred to be used as the signal line 10A, and there is no influence due to noise when providing an optical synchronized signal to each voltage command means 8A of the inverters respectively.

The synchronized signal generation circuit 10 generates a synchronized signal every half cycle, single cycle, or preset cycle of the standard sine wave voltage determined in advance. In other words, a synchronized signal is generated at a cycle determined for each single cycle of the reference voltage Va represented by the standard sine wave voltage. Each voltage command means 8A generates the reference voltage Va represented by the standard sine wave voltage (Esinωt) by synchronization with the initiation of each synchronized signal. Accordingly, there is no significant difference in amplitude of the output voltage in the normal state, since the frequency of the output voltage of each inverter is the same with the frequency of the standard sine wave voltage (Esinωt), and the phase is also the same. In addition, the synchronized signal generation circuit 10 may be omitted when the voltage command means 8A of each inverter has the same mutual frequency as well as generating the standard sine waveform signals which are mutually synchronized, and the standard sine waveform signals are generated in synchronization while mutually following up.

The inverters 80(1) and 80(2) perform the PWM control with the constantly-sampled error-tracking-mode type by synchronization; however, the size, i.e. the amplitude, of the output voltage of the inverters 80(1) and 80(2) are often different. In this case, a portion of the output electric current tries to flow from one of the inverters having a larger amplitude of output voltage to the other inverter having a smaller amplitude; however, because the inverters 80(1) and 80(2) have the equivalent output impedance Z, which is to the extent given above, in which the cross-current can be limited to be an acceptable value or below in the present invention, the voltage drop of the output filter circuit 4 becomes larger as output current increases, and the output voltage of the inverter moves in the down direction, so error-tracking-mode PWM control is performed so that the output voltage can be mutually equal to each of the inverters after all.

Accordingly, even when a power source in which a large number of units of the inverters are connected in parallel, cross-current can be controlled to be an acceptable value or below without performing a special control for cross-current suppression according to the power source 100 of Embodiment 1. Because the equivalent output impedance Z is an equivalent impedance, an actual power loss does not occur. Accordingly, even though the equivalent output impedance Z increases, the electric power loss does not increase, and cross-current can be suppressed to a small value by that much; however, because decreasing the output voltage makes it larger, the equivalent output impedance Z of each inverter is preferred to be a value in which each inverter can apply the rated electric current sufficiently, and also a value that can control the cross-current to be an acceptable electric current value. Although the acceptable value cannot be categorically determined since cross-current differs according to the power source, for instance, when the rated voltage of the inverters 80(1) and 80(2) is Vr, the rated electric current is Ir, and R is 100(%) at the time of Vr/Ir=R, a preferred value of the equivalent output impedance is about 2 through 10%. As a specific example, when Vr=200V and IR=10 A, 100% of the equivalent output impedance Z value is 20%, 2% is 0.4Ω, and 10% is 2Ω. Accordingly, each output voltage feedback gain α is set respectively first from conditions, and the output electric current feed forward gain β is set respectively so as to be a preset equivalent output impedance. The equivalent output impedance of each inverter does not need to be at the same value when the output capacity is not the same or load sharing does not need to be unified.

These values of the equivalent output impedance Z are only rough targets, and if the electric current value of the acceptable cross-current is large, the ratio of the equivalent output impedance Z is allowed to be smaller than stated above, and conversely, if the acceptable electric current value of the cross-current is severe, the ratio of the equivalent output impedance Z may be larger than that above stated. Accordingly, when a plurality of units of the constantly-sampled error-tracking-mode inverters 80 are operated in parallel, since the output voltage feedback gain α and the output electric current feed forward gain β that are the control parameters are set so as to be the resistance value in which cross-current can be limited to be an acceptable value or below, the equivalent internal Impedance Z of each inverter can reliably limit the cross-current to be an acceptable value or below without a special control as long as no trouble such as a failure or the like occurs, or the output voltage feedback gain α and the output electric current feed forward gain β are changed to different values.

The First Operational Method of the Inverter Device 100

When reaching the condition in which the load power demand is decreased and only inverter 80(1) can correspond to the load demand, the inverter 80(2) may be separated for the sake power efficiency. However, when the power source switch SW is open during operation, it is open and susceptible to activities such as surge occurrences or an increase in voltage. The power source switch SW is difficult to be applied automatically in a small amount of time when closing of the power source switch SW becomes necessary, and there are some problems with this namely a negative impact from surge into the load or inverter. Therefore, in the present Embodiment, the value of the equivalent output impedance Z of the inverter 80(2) which needs to be separated is made sufficiently large, and the output voltage feedback gain α and the output electric current feed forward gain β that are the control parameters are set first at small values according to the sequence so as to be the first set value Zm (hereinafter referred to as the set maximum value) which can make the output of the inverter small enough to be ignored. When the equivalent output impedance Z at that time is selected to be a value so that, for instance, β=α=10−5 while the electric current gain G is near 1, the resistance portion of the equivalent output impedance Z becomes about 100 kΩ, and when the output voltage is 200V, since the output electric current becomes 2 mA even at the maximum, and the output is about 0.4 W, the output electric current can be near zero, and it enters a virtual state of suspension. In this case, the equivalent output impedance Z of the inverter 80(2) works as the breather resistance and which does not make the voltage between the output terminals increase. Accordingly, the same effect in which the inverter 80(2) is in effect separated can be obtained without turning the power source switch SW off while electrically connecting. Further, when the power efficiency is needed to be improved, the power source switch SW may be in an off state while in a virtual state of suspension. At that time, a shockless separation effect can be obtained in which there is in effect no negative impact given to the devices and system, by changing the numerical values of the output voltage feedback gain α and the output electric current feed forward gain β by covering time, for instance, three or more times the length of time than a single cycle of the output voltage and not change it instantly.

The Second Operational Method of the Inverter Device 100

Further, when the load power demand is increased and the inverter 80(1) alone can no longer correspond to the load power demand, or a drop in the power efficiency occurs, the inverter 80(2) must be closed again. In this regard, by storing a value which corresponds to the maximum sharing power of the inverters 80(1) and 80(2) in the microcomputer (not illustrated) in advance, or storing the acceptable power efficiency value, when the power demand exceeds the value which corresponds to the stored maximum sharing power of the inverter 80(1), or exceeds the stored acceptable power efficiency value, the control parameters which are the output electric current feed forward gain β and the output voltage feedback gain α are changed to a large original value or near that value so that the equivalent output impedance Z of the inverter 80(2) can be nearly the same as the value Zs of the equivalent output impedance Z of the inverter 80(1) during the operation from the first set value Zm that is a sufficiently large value according to the sequence which is opposite from the description above. The value Zs of the equivalent output impedance Z is a value of a level which can control the cross-current to be an acceptable value or below, and which is a range, for instance, of about a few % through 10% of the equivalent output impedance Z value calculated from the output voltage and the output electric current. Further, when the load sharing of inverters which are operated in parallel is unified, the equivalent output impedance Z of each inverter is set at the value Zs during the operation which is nearly the same. This modification is like the description above, a shockless application effect can be obtained in which there is in effect no negative impact given to the devices and system, by changing to cover time, for instance, three times or more the length of time of the output voltage.

The Third Operational Method of the Inverter Device 100

Particularly, when the inverters during the operation are operated at the highest power efficiency or around that area for the case in which a plurality of the constantly-sampled error-tracking-mode inverters which are the inverters that enable the equivalent impedances to control by only a large number of control parameters are connected in parallel, interrupt or close of inverters of a number of units which are compatible in accordance with changing of the load power demand is a frequent occurrence. In the case of a power system in which 20 units, for instance, of constantly-sampled error-tracking-mode inverters are connected in parallel, the load power demand decreases in the state where 20 units of constantly-sampled error-tracking-mode inverters are operated at a high range of the power efficiency; and if the operation can be proceeded at a high range of power efficiency operating by 19 units of constantly-sampled error-tracking-mode inverters, the microcomputer (not illustrated) calculates how many units of inverters can operate at the high range of the power efficiency by monitoring the power efficiency from the input electric power and the output electric power, and which makes the applicable number of constantly-sampled error-tracking-mode inverters to keep operating, and changes the equivalent output impedance Z of the rest of the constantly-sampled error-tracking-mode inverters to the set maximum value Zm which is the first set value in the manner of the above description, and has them virtually suspended.

By so doing, the output power of the number of constantly-sampled error-tracking-mode inverters in suspension mode can be in effect zero. When the power demand is further decreased, likewise the equivalent impedance Z of inverters which are needed to be suspended is changed to be the set maximum value Zm in the similar manner described above. At that time, the output electric current feed forward gain β and the output voltage feedback gain α of the applicable inverters are changed to a large value. This change, as in the above description, can also be made by covering a longer time than the preset time, for instance, three times or more the length of time than a single cycle of output voltage, and a shockless interrupt effect can be obtained in which there is in effect no negative impact given to the devices and system, and at the same time, power efficiency can be improved. When power demand is regained and the constantly-sampled error-tracking-mode inverters in a state of suspension are needed, the output electric current feed forward gain β and the output voltage feedback gain α are changed to a large value so as to be nearly the same value, or in the vicinity of that value, as the equivalent output impedance Z of other operating inverters. This change, as in the above description, can also be made by covering a time longer than the preset time, for instance, three times or more length of time of a single cycle of output voltage, and a shockless application effect can be obtained in which there is no negative impact given to the devices and system.

The Fourth Operational Method of the Inverter Device 100

Next, an explanation is given regarding the time of testing or maintenance and inspection in a power source system in which a plurality of constantly-sampled error-tracking-mode inverters are connected in parallel as shown in FIG. 1 as an example of an inverter that has the ability to control the equivalent output impedance by only the control parameters. Although the illustration is not shown specifically, FIG. 3 shows an inverter in which N units of inverters 80 (N is an integer number of 2 or greater) are connected in parallel. Testing or maintenance and inspection of the individual constantly-sampled error-tracking-mode inverter of such power source system is performed one by one in order. The equivalent output impedance Z of an inverter subjected to testing or maintenance and inspection is increased until the set maximum value Zm which is the first set value and a state of suspension is created. Testing or maintenance and inspection items which can be performed in a state of suspension, and can be performed while remaining in an ON state with no need to turn off the power source switch SW. In other words, the equivalent output impedance Z of an inverter subjected to testing or maintenance and inspection is increased to the set maximum value Zm, and testing or maintenance and inspection is performed after a state of suspension is created; and then, the power feed is initiated by decreasing the equivalent output impedance Z from the set maximum value Zm to the value Zs in the same manner as the equivalent output impedance Z of other operating inverters after the testing or maintenance and inspection is completed. Similar operation is also performed for the next inverter to be tested or maintained and inspected. By repeating such operation, the power can be supplied to the load circuits during the test or maintenance and inspection of each inverter of the power source system in which a plurality of the constantly-sampled error-tracking-mode inverters are connected in parallel, and not only performing promptly without turning the power source switch SW off, but a shockless interruption and closing of inverter as described above can be realized.

Testing or maintenance and inspection items that cannot be performed while the power source switch SW remains on are also performed on an individual constantly-sampled error-tracking-mode inverter of the power system one by one in order. First, the equivalent output impedance Z of an inverter subjected to testing or maintenance and inspection is increased until the set maximum value Zm which is the first set value and a state of suspension is created, and then the power source switch SW is turned off and separated from other inverters. Testing or maintenance and inspection is performed in regards to the separated inverter. After testing or maintenance and inspection of the inverter is completed, the power is supplied by turning on the power switch SW while the equivalent output impedance Z of the inverter remains at the set maximum value Zm, and decreasing the equivalent output impedance Z which is set at the set maximum value Zm until the value Zs similar to the equivalent output impedance Z of other operating inverters. Similar operation is also performed for the next inverter to be tested or maintained and inspected. By repeating such operation, the power can be supplied to the load circuits during the testing or maintenance and inspection of each inverter of the power source system in which a plurality of constantly-sampled error-tracking-mode inverters are connected in parallel, and at the same time a shockless interrupt and closing of an inverter as described above can be realized. An interval of time for decreasing the equivalent output impedance Z from the maximum set value Zm to the small value Zs at the time of operation, or changing from a small value Zs at the time of operation to the maximum set value Zm is a preset time or longer as described above, for instance, preferably taking a 3 times or more length of time for a single cycle of the output voltage from the view of performing shockless interrupt and closing.

The Fifth Operational Method of the Inverter Device 100

When a power source system of a single constantly-sampled error-tracking-mode inverter, or a plurality of these devices are connected in parallel is connected to a commercial AC electrical power system (not illustrated), the opening and closing of the inverter is possible by the operation as described above. However, at the time of application, the equivalent output impedance Z of the inverter 100, inverter 80(1), or 80(2) to close remains at the set maximum value Zm, and while decreasing from the set maximum value Zm to the value Zs at the time of operation after closing, which must be synchronized with the cycle of the commercial AC electrical power system. In order to execute little surge effect, in other words, a shockless closing to a commercial AC electrical power system, preferably 50 times or more length of time for a single cycle of a commercial AC electrical power system. At the time of opening is also done in a similar manner, and it is preferred in performing a shockless opening that the equivalent output impedance Z of the constantly-sampled error-tracking-mode inverters to be opened are increased from the value Zs in operation to the set maximum value Zm by covering time of 50 times or more length of time for a single cycle of a commercial AC electrical power system.

In addition, the construction of an inverter 2 may be a half bridge construction or a single-phase voltage doubler inverter which is composed as a single-phase voltage doubler by connecting two DC power sources 1 in a series; and an explanation of a half bridge construction or a single-phase voltage doubler inverter and a single-phase inverter that adopts constantly-sampled error-tracking technology having an equivalent output impedance Z expressed by the formula $(1-\beta \cdot G)/$ ($\alpha \cdot G$) is omitted in regards to these unit operations because the explanation is given in the patent reference documents presented above.

Accordingly, when a plurality of these inverters is operated by connecting in parallel, the cross-current between the inverters in a similar manner as described above can be limited to be an acceptable value or below by making the equivalent output impedance Z that is nearly equal to the resistance value expressed by the formula $(1-\beta \cdot G)/(\alpha \cdot G)[\Omega]$ to be mutually the same. Further, when an equivalent output impedance Z of the constantly-sampled error-tracking-mode inverters which are connected in parallel is selected to a different value, the output capacity loaded by each inverter can be arbitrarily changed. Even through the inverters $80(1)$, $80(2)$, ... $80(N)$ connected in parallel have differing output capacities, the operation described above can be realized.

Further, when a plurality of these inverters is operated by connecting in parallel, by adjusting the equivalent output impedance Z expressed by the formula $(1-\beta \cdot G)/(\alpha \cdot G)[\Omega]$ to be the size of unacceptable cross-current, the cross-current between the inverters can also be limited, in a similar manner as described above, to be an acceptable value or below by detecting the cross-current without providing a special control. Furthermore, in the above explanation, each inverter which is connected in parallel has nearly equal output capacity; however, it can be easily understood that cross-current can be limited to be an acceptable value or below by adjusting the equivalent output impedance in conformity to output sharing even if inverters which have different output capacity are connected in parallel.

Further, in the same manner as the above Embodiment 2, the three-phase AC output voltage of all of the constantly-sampled error-tracking-mode three-phase AC inverters $90(1)$, $90(2)$, ... $90(3)$ that are operated in parallel also have a mutually unified phase, in other words, which are synchronized in the present Embodiment. As described in the above Embodiments, because the equivalent output impedance Z can easily be set to the set maximum value Zm, or in the vicinity of that value, or to a small value Zs, in operation by adjusting the output electric current feed forward gain $\beta$ and the output voltage feedback gain $\alpha$ of the error-tracking-mode three-phase AC inverters $90(1)$, $90(2)$, ... $90(3)$ according to the sequence of the microcomputer (not illustrated), a shockless input, interrupt, or the like can be performed without giving a negative impact due to surge to the load or the like.

In other words, the three-phase AC inverter of above Embodiment 2 can be operated in the similar manner to the operational methods 1 through 4 of the single-phase inverter 100 explained in the present embodiment. In addition, the similar operation to the above operation method 1 of the constantly-sampled single phase error-tracking-mode inverter 100 in Embodiment 1, can be performed regarding the operational method for suppressing the inrush current at the time of starting-up of the constantly-sampled error-tracking-mode three-phase AC inverter 90.

In above Embodiments, an explanation is given mainly in regards to when the constantly-sampled error-tracking-mode inverter is operated independently from the commercial AC electrical power system despite an individual operation or parallel operation; however, there may be a case for operating by connecting to a commercial AC electrical power system. In this case, it may be necessary to separate this constantly-sampled error-tracking-mode inverter from the commercial AC electrical power system so as to open or close. When connecting to a commercial AC electrical power system, the equivalent output impedance Z of the three-phase AC inverter 200, or all connected inverter systems 90 is set to the set maximum value Zm and a virtual state of suspension is made by appropriately setting the output electric current feed forward gain $\beta$ and the output voltage feedback gain $\alpha$ in advance in the similar manner to the description in the operational method of Embodiment 2, and connecting to the commercial AC power source can be realized in such condition without performing a synchronization detection. In this case, after connecting to the commercial AC electrical power system without a synchronized detection, the phase of the inverter is matched to the phase of the commercial AC electrical power system while the equivalent output impedance Z of each inverter is decreased gradually to the value Zs in operation from the set maximum value Zm by increasing the output electric current feed forward gain $\beta$ and the output voltage feedback gain $\alpha$ according to the sequence of the microcomputer (not illustrated). In other words, the synchronized detection is performed. At that time, in order to prevent generation of a surge voltage with the commercial AC electrical power system, the equivalent output impedance Z of all connected inverters is preferred by covering a time of 50 times or more length of time for the cycle T of the commercial AC electrical power system.

A sampling type error-tracking-mode power source is explained in the above description as Embodiments; however, the present invention is not limited to this, and every inverter in which equivalent output impedance can be adjusted and modified by only the control parameters such as the output voltage feedback gain $\alpha$ and the output electric current feed forward gain $\beta$, can be applied.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An inverter in which an equivalent output impedance is a resistance value expressed by $(1-\beta^*G)/(\alpha^*G)$ when $\alpha$ is an output voltage feedback gain, $\beta$ is an output current feed forward gain, and G is an inverter current gain, wherein
    the inverter adjusts the inverter output power by changing the equivalent output impedance by adjusting both or either one of the output voltage feedback gain $\alpha$ or the output current feed forward gain $\beta$.

2. An inverter in which an equivalent output impedance is a resistance value expressed by $(1-\beta^*G)/(\alpha^*G)$ when $\alpha$ is an output voltage feedback gain, $\beta$ is an output current feed forward gain, and G is an inverter current gain, wherein
    the inverter changes the equivalent output impedance by adjusting both or either one of the output voltage feedback gain $\alpha$ or the output current feed forward gain $\beta$,
    the equivalent output impedance of the inverter prior to start feeding of power is set to be a first set value that limits an output current to be a desired value or below by changing the equivalent output impedance by adjusting both or either one of the output voltage feedback gain $\alpha$ or the output current feed forward gain $\beta$; and
    the equivalent output impedance of the inverter is decreased after starting feeding of power to be a second set value that is smaller than the first set value.

3. An inverter in which an equivalent output impedance is a resistance value expressed by $(1-\beta^*G)/(\alpha^*G)$ when $\alpha$ is an output voltage feedback gain, $\beta$ is an output current feed forward gain, and G is an inverter current gain, wherein the inverter changes the equivalent output impedance by adjusting both or either one of the output voltage feedback gain α or the output current feed forward gain β, the equivalent output impedance is set to be a first set value that limits an output current to be a desired value or below;

the inverter is connected in parallel to another inverter without synchronism, or is connected to a commercial AC electrical power system;

an output voltage of the inverter is synchronized with an output voltage of said another inverter or to an voltage of the commercial AC electrical power system without performing synchronism; and the equivalent output impedance of the inverter is changed to a second set value that is smaller than the first set value.

4. An inverter in which an equivalent output impedance is a resistance value expressed by $(1-\beta*G)/(\alpha*G)$ when α is an output voltage feedback gain, β is an output current feed forward gain, and G is an inverter current gain, wherein the inverter changes the equivalent output impedance by adjusting both or either one of the output voltage feedback gain α or the output current feed forward gain β, the equivalent output impedance of the inverter is set to be a first set value or below that limits an output current to be a desired value by adjusting both or either one of the output voltage feedback gain α or the output current feed forward gain β when substantially stopping or suspending feeding of power.

5. The inverter according to claim 2, wherein the equivalent output impedance is changed to the first set value or the second set value in time that is 3 times or more a length than an output cycle t of the inverter when not connected to a commercial AC electrical power system, and 50 times or more than a length of a commercial AC power cycle when connected to the commercial AC electrical power system.

6. An electric power source in which a plurality of inverters operate on a same frequency and connected in parallel while an equivalent output impedance of each of the inverters that is a resistance value is expressed by $(1-\beta*G)/(\alpha*G)$ when α is a voltage feedback gain, β is an electric current feed forward gain, and G is an inverter current gain, wherein a load sharing of the inverter is adjusted by changing the equivalent output impedance by controlling both or either one of the voltage feedback gain α or the electric current feed forward gain β.

7. The electric power source according to claim 6, wherein:

the equivalent output impedance of the inverter is set to a first set value which is a large value determined respectively, in order to substantially prevent sharing a load if the inverter is included in a portion of the power source;

the equivalent output impedance of the inverter is set to a second set value which is smaller than the first set value determined respectively, in order to share the load if the inverter is not included in the portion of the power source; and the equivalent output impedance of all or a portion of the inverters of the power source is changed to the first set value in order to substantially stop or suspend sharing the load when a load demand decreases.

8. The electric power source according to claim 6, wherein:

the equivalent output impedance of the inverter included in a portion of the power source is set to a first set value while the equivalent output impedance of the inverter is set to a second set value if the inverter is not included in the portion of the power source; and the equivalent output impedance of all or a portion of the inverters is changed to the second set value when an increase of the load is detected.

9. The electric power source according to claim 6, wherein:

the inverter, comprises:
an inverter converting DC input into AC output;
an output filter provided at an output side of the inverter;
a first electric current detection unit detecting AC current flowing between the inverter and the output filter;
a second electric current detection unit detecting AC current flowing to an output terminal of the inverter;
an AC voltage detection unit detecting a voltage of the output filter;
an electric current reference value formation unit generating an current target value J(t) obtained by adding a signal obtained by multiplying the electric current feed forward gain β that is one of the control parameters by an electric current detection signal from the second electric current detection unit, to a signal value obtained by multiplying the voltage feedback gain α which is other control parameter by the voltage signal value which indicates a difference between the voltage detected by the AC voltage detection unit and a reference voltage; and
a gate signal and PWM control unit for providing gate signals that control an instantaneous value of an inverter current to the inverter by sampling an error signal Δ(t) which shows a difference between the current target value J(t) and a signal value of the AC current detected by the first electric current detection unit, at each constantly-sampled cycle in order to reduce the error signal value Δ(t).

10. The electric power source according to claim 6, wherein m units of the inverters feed electrical power while satisfying a equation $Pd*m>Wt>Pd*(m-1)$, where:
N is a number of the inverters connected in parallel;
Wt is a total demanded load;
Pr is a normal rated power of the inverter;
Xu is an acceptable limit value of power efficiency;
Pu is a lower limit value of an output power corresponding to Xu;
Pd is a power between Pr and Pu; and
m</=N.

11. The electric power source according to claim 9, wherein the gate signal and PWM control unit generates a high frequency PWM signal for controlling an instantaneous value of the electric current by sampling the error signal value Δ(t) at each constantly-sampled cycle and provides the inverter in order to reduce the error signal value Δ(t).

12. An electric power source comprising:

a plurality of inverters according to claim 1 connected in parallel and that operate on a same frequency, wherein
cross-currents among the inverters are reduced to an acceptable value or below by adjusting each of the inverter output.

13. The electric power source according to claim 9, wherein:

a plurality of the inverters are connected in parallel and operate on a same frequency and on a same phase;
all reference voltages of the inverters are generated at a same time; and
the inverter respectively adjusts the equivalent output impedance in order to reduce cross-currents among the inverters to an acceptable value or below.

14. The electric power source according to claim 12 further comprising:
a power cycle signal generation unit that generates a power cycle signal to determine an output frequency of the electric power source, wherein:
the power cycle signal generation unit supplies the power cycle signal to each of the inverters; and
the inverter respectively receives the power cycle signal from the power cycle signal generation unit and comprises a voltage reference unit that generates a reference voltage synchronized to the power cycle signal.

* * * * *